US007661127B2

(12) United States Patent
Hirsch

(10) Patent No.: US 7,661,127 B2
(45) Date of Patent: Feb. 9, 2010

(54) INSTRUMENT ACCESS CONTROL SYSTEM

(75) Inventor: Thomas Steven Hirsch, Bedford, MA (US)

(73) Assignee: Millipore Corporation, Billerica, MA (US)

( * ) Notice: Subject to any disclaimer, the term of this patent is extended or adjusted under 35 U.S.C. 154(b) by 519 days.

(21) Appl. No.: 10/292,666

(22) Filed: Nov. 12, 2002

(65) Prior Publication Data
US 2004/0093526 A1 May 13, 2004

(51) Int. Cl.
*H04L 9/00* (2006.01)
(52) U.S. Cl. .......................................... 726/5; 726/28
(58) Field of Classification Search ................ 726/2–5, 726/26–29; 713/155, 168
See application file for complete search history.

(56) References Cited

U.S. PATENT DOCUMENTS

| 6,044,465 | A | 3/2000 | Dutcher et al. ............. 713/200 |
| 6,055,637 | A * | 4/2000 | Hudson et al. ............... 726/20 |
| 6,345,087 | B1 | 2/2002 | Batham .................... 379/32.05 |
| 6,389,491 | B1 | 5/2002 | Jacobson et al. ............. 710/62 |
| 6,401,211 | B1 | 6/2002 | Brezak, Jr. et al. .......... 713/201 |
| 6,886,100 | B2 * | 4/2005 | Harrah et al. .................. 726/3 |
| 6,947,989 | B2 * | 9/2005 | Gullotta et al. ............. 709/226 |
| 7,039,948 | B2 * | 5/2006 | Harrah et al. ................... 726/6 |
| 7,085,773 | B2 * | 8/2006 | Dorsett, Jr. ............... 707/104.1 |
| 2002/0095571 | A1 * | 7/2002 | Bradee ....................... 713/164 |
| 2002/0110123 | A1 | 8/2002 | Shitama ...................... 370/389 |
| 2002/0129248 | A1 * | 9/2002 | Wheeler et al. ............. 713/170 |
| 2002/0147801 | A1 * | 10/2002 | Gullotta et al. ............. 709/223 |
| 2002/0169876 | A1 * | 11/2002 | Curie et al. ................. 709/226 |
| 2002/0178119 | A1 * | 11/2002 | Griffin et al. .................. 705/54 |

FOREIGN PATENT DOCUMENTS

| EP | 1133102 | 9/2001 |
| EP | 1215853 | 6/2002 |
| EP | 1235156 | 8/2002 |

OTHER PUBLICATIONS

"Cerity NDS Technical Reference Guide", pp. 4-13.
"Agilent Cerity Networked Data System for Pharmaceutical QA/QC", Agilent Technologies Publication (May 2002).
"Agilent Cerity Networked Data System for Pharmaceutical QA/QC", Revision A.01.0x, Agilent Technologies Publication (Aug. 2002).

(Continued)

*Primary Examiner*—Beemnet W Dada

(57) ABSTRACT

A system for centrally managing a set of network-connected laboratory instruments is disclosed. For example, the system includes a centralized database that includes information about the instruments in the system and about the authorized users of the system. In particular, the centralized database indicates which users are authorized to use each of the instruments in the system. The database may also include information about the operations that each user is authorized to perform using the instruments and information indicating whether tests performed by each instrument must be signed using one or more electronic signatures. The system may recognize a number of "roles," each of which is associated with a particular set of rights, and may assign one or more roles to each user. Instruments and other elements of the system may access the centralized database over a network to enforce the user rights represented by the information in the database.

28 Claims, 22 Drawing Sheets

OTHER PUBLICATIONS

Doherty et al., "A Networked Data System for Specific Chromatography Applications", American Laboratory, pp. 50-57 (Feb. 2000).
"PageCounter Professional", Equitrac Corporation Product Brochure (2001).
"PageControl Station", Equitrac Corporation Product Brochure (2001).
"Accountrac", Equitrac Corporation Product Brochure (2001).
Patent Abstracts of Japan, Pub. No. 2002063008 (JP 251 439, filed Feb. 28, 2002).
Patent Abstracts of Japan, Pub. No. 2002009843 (JP 136 371, filed Jan. 11, 2002).
Patent Abstracts of Japan, Pub. No. 2001243093 (JP 000 682, filed Jan. 1, 2001).
Partial International Search Report for International Application No. PCT/US03/35354 (Annex to PCT/ISA/206 dated Aug. 5, 2004).
F. Gitler et al., "The DCE Security Service", Hewlett-Packard Journal, vol. 46, No. 6 (Dec. 1, 1995), pp. 41-48.
"Partial Containment Structure for Integraton of Distributed Computing Environment and Local Registries", IBM Technical Disclosure Bulletin, vol. 38, No. 9 (Sep. 1995).
H. Hedborn et al., "Analysis of the Security of Windows NT", Department of Computer Engineering, Chalmers University of Technology, XP-02288575 (Mar. 1, 1999), pp. 14, 34-35.

* cited by examiner

132

| | 312a | 312b | 312c | 312d | 312e | |
|---|---|---|---|---|---|---|
| | User ID | Role | User Rights | Username | Password | |
| | 0 | 1 | | jsm | a327 | 314a |
| | 1 | 0 | Calibrate | ajn | rr88 | 314b |
| | 2 | 3 | | bkr | jon | 314c |
| | 3 | 4 | | dpw | d221 | 314d |
| | 4 | 2 | Diagnostics | rwn | kpn | 314e |

| | 322a | 322b | 322c | 322d | 322e | |
|---|---|---|---|---|---|---|
| | Instrument ID | Tests | Users | Signatures | Report Send | |
| | 0 | | 3,4 | None | Auto | 324a |
| | 1 | 2 | | One | Manual | 324b |
| | 2 | | 2 | Two | | 324c |
| | 3 | 1,3 | | Two, Super. | | 324d |
| | 4 | | -4 | None | | 324e |
| | 5 | | | | | 324f |

*FIG. 3C*

| Group ID | Instruments | Tests | Users | Signatures | Report Send |
|---|---|---|---|---|---|
| 0 | 0,1 | 0,1 | 0,1,2 | | |
| 1 | 2,3,4 | 0,2,4 | 0,4 | | Auto |
| 2 | 5 | 1 | 0,1,2 | One | Manual |

| Test ID (342a) | Test Name (342b) | Test Sequence (342c) | |
|---|---|---|---|
| 0 | Diffusion | | 344a |
| 1 | Bubble Point | | 344b |
| 2 | Enhanced Bubble Point | | 344c |
| 3 | Water Intrusion Test | | 344d |
| 4 | System Integrity Test | | 344e |
| 5 | Virus Diffusion Test | | 344f |

*FIG. 3E*

INSTRUMENT ACCESS CONTROL SYSTEM

FIELD

The present invention relates to controlling access to laboratory instruments and, more particularly, to controlling access to network-connected laboratory instruments.

BACKGROUND

Access to laboratory instruments must be closely controlled to ensure that the tests performed using such instruments satisfy strict quality standards and comply with legal and organizational requirements. For example, Title 21, Part 11 of the Code of Federal Regulations (referred to hereinafter as 21 CFR Part 11) allows certain electronic records and electronic signatures to be submitted to the Food and Drug Administration (FDA) in lieu of paper records, provided that such electronic records and signatures comply with certain specified requirements.

In particular, 21 CFR Part 11 requires that the methods by which such electronic records and signatures are produced ensure that persons who develop, maintain, or use electronic records and signature systems have the education, training, and experience to perform their assigned tasks. Furthermore, access to laboratory instruments must be limited to authorized individuals, operational system checks must be used to enforce permitted sequencing of steps and events as appropriate, and authority checks must be used to ensure that only authorized individuals can use the system, electronically sign a record, access the operation or computer system input or output device, alter a record, or perform operations. Electronic signatures not based on biometrics must employ at least two distinct identification components such as an identification code and password. The requirements of 21 CFR Part 11 are being enforced with increasing strictness.

It is desirable to automate enforcement of at least some of the requirements of 21 CFR Part 11 by requiring user authentication prior to using a particular laboratory instrument. In existing authentication systems, each laboratory instrument is typically connected directly to a distinct personal computer or other authentication device. The authentication device connected to a particular laboratory instrument is configured with access control information related to the laboratory instrument, such as the usernames and passwords of users who are authorized to use the instrument. To gain access to the instrument, a user must provide his username and password or other identifying information. The authentication device only grants the user access to the instrument if the authentication succeeds.

One problem with such a system is that a distinct-authentication device must be programmed with access control information for each laboratory instrument in the system. Performing such programming can be tedious and time-consuming because the same access control information for some or all users of the system must be redundantly programmed into some or all of the authentication devices. If the access rights of a particular user change, the access control information at each access control device must be updated. Similarly, to remove a user from the system or add a new user to the system, it is necessary to reprogram some or all of the access control devices. This can be a tedious, time-consuming, and error-prone process.

In some systems, the instruments and/or the authentication devices to which they are connected are further connected to a communications network, such as a Local Area Network (LAN). An example of such a system is the Cerity Networked Data System (NDS), available from Agilent Technologies of Palo Alto, Calif. The Cerity NDS reuses the user authentication scheme of the Microsoft Windows® operating system to authenticate users, thereby eliminating the need to replicate user authentication information at each access control device. The Windows® user authentication scheme, however, is designed for authenticating users of a generic networked operating system rather than users of a networked system having the unique and stringent requirements associated with research, development, and production laboratories. As a result, the user authentication features provided by the Windows® user authentication scheme are sub-optimal for use in such a system.

What is needed, therefore, is an automated user authentication system suitable for authenticating users of laboratory instruments.

SUMMARY

In one aspect, the present invention features a system for centrally managing a set of network-connected laboratory instruments. For example, the system includes a centralized database that includes information about the instruments in the system and about the authorized users of the system. In particular, the centralized database indicates which users are authorized to use each of the instruments in the system. The database may also include information about the operations that each user is authorized to perform using the instruments and information indicating whether tests performed by each instrument must be signed using one or more electronic signatures. The system may recognize a number of "roles," each of which is associated with a particular set of rights, and may assign one or more roles to each user.

Access to instruments in the system may be controlled by requiring that users authenticate themselves at an instrument to obtain access to the instrument. In particular, users may be required to provide credentials (such as a username and password) to access an instrument. The instrument may authenticate the user over the network and determine whether the user has the right to access the instrument by accessing the centralized database over the network and determining whether the user has the right to access the instrument by reference to the information contained in the database. The user may be granted access to the instrument if the user has the right to access the instrument and be denied access to the instrument otherwise. Once the user's right to access a particular instrument has been verified, the user may be allowed to perform only those functions that the user has the right to perform, as determined by reference to the information contained in the centralized database.

Users with sufficient rights may perform tests using the instruments. Some tests may require one or more electronic signatures upon completion. Some tests may require that the second of two signatures be provided by a supervisor. An instrument on which a test is performed may authenticate any signatures that are provided to it and, when required, may access the user information stored in the centralized database to verify that the second signature is provided by a supervisor.

Other features and advantages of various aspects and embodiments of the present invention will become apparent from the following description and from the claims.

BRIEF DESCRIPTION OF THE DRAWINGS

FIG. 3B is a block diagram of a users list according to one embodiment of the present invention;

FIG. 3C is a block diagram of an instruments list according to one embodiment of the present invention;

FIG. 3D is a block diagram of an instruments group list according to one embodiment of the present invention;

FIG. 3E is a block diagram of a test definitions list according to one embodiment of the present invention;

DETAILED DESCRIPTION

Figure 1:
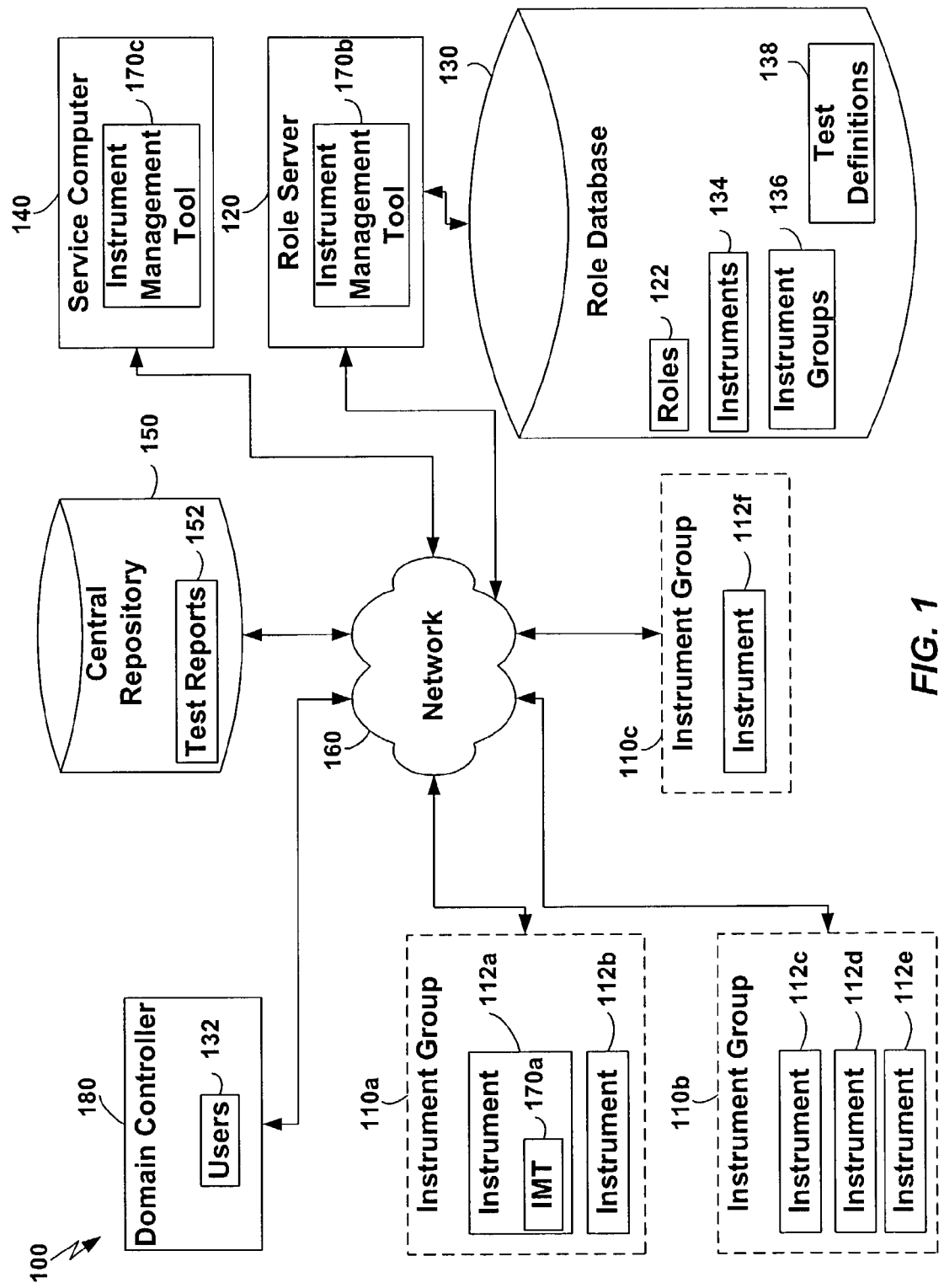
FIG. 1 is a block diagram of an instrument access-control and management system according to one embodiment of the present invention.

Referring to FIG. 1, an instrument access-control and management system 100 is shown in block diagram form according to one embodiment of the present invention. The system 100 includes a plurality of instruments 112a-f coupled to a communications network 160. Users of the system 100 must be authenticated to obtain access to the instruments 112a-f. In particular, to obtain access to a particular one of the instruments 112a-f, a user must provide credentials which demonstrate that the user has access rights to the instrument. Only upon providing such credentials is the user granted access to the instrument.

When a user approaches an instrument, the instrument (or an authentication device coupled to the instrument) requests credentials from the user. After the user provides such credentials (e.g., a username and password), the credentials are transmitted over the network 160 to a domain controller 180 coupled to the network 160, which attempts to authenticate the user based on the credentials provided. The domain controller 180 may, for example, be a conventional Windows 2000 or Windows NT domain controller. The domain controller 180 may maintain a users list 132, which contains information descriptive of the authorized users of the system 100. The instruments 112a-f may, therefore, rely on the authentication mechanism of the underlying operating system (such as Microsoft Windows XP) to perform user authentication. If the authentication fails, the user is denied access to the instrument.

If the authentication succeeds, the instrument determines whether the user has the right to access the instrument. A role server 120 coupled to the network 160 may manage the instrument access rights of each user of the system 100. The instrument may request information from the role server 120 about the instrument access rights of the current user and thereby determine whether the user has the right to access the instrument. Instrument access is denied to the user if it is determined that the user does not have the right to access the instrument. In this way, access to the instrument may be controlled both by the underlying operating system's authentication system and by a distinct centrally managed system of user instrument access rights.

Even if the user is granted access to the instrument, the user may not be granted unfettered access to the instrument. Rather, the user may be allowed to perform only a limited set of operations on the instrument. Upon successfully authenticating a particular user, an instrument may obtain the user's access rights from the role server 120 and limit the actions that may be performed by the user to those actions associated with the user's access rights.

In particular, the role server 120 may maintain a role database 130, which contains: (1) an instruments list 134, which contains information descriptive of the instruments 112a-f; (2) a roles list 122, which describes a set of user roles, (3) an instrument groups list 136, which defines logical groups 110a-c of instruments 112a-f, and (4) a test definitions list 138, which defines tests that may be performed by the instruments 112a-f. If user authentication succeeds, the instrument may provide access rights to the user in accordance with the information in the role database 130.

In summary, user authentication may be performed by the underlying operating system, while the rights granted to authenticated users may be defined by the rights specified in the role database 130. Furthermore, access to particular instruments may be granted or denied to users based on their individual identities and/or roles. The invention therefore provides a means for centrally managing user authentication and instrument access rights.

Once logged in to an instrument, the user may use the instrument to perform various actions, such as using the instrument to perform tests. The set of functions that may be performed by the user is defined by the user's rights, as specified in the role database 130. The user may, for example, be limited to performing only particular tests in accordance with the information stored in the role database 130. The instrument list 134, for example, may associate each of the instruments 112a-f with one or more of the tests defined by the test definitions 138, thereby indicating which tests each of the instruments is allowed to perform. Furthermore, the users list 132 may specify which tests each user is allowed to perform.

A software application program referred to herein as the "instrument management tool" may be used to access and modify the information contained in the role database 130 and to instruct the instruments 112a-f to perform various functions, such as running tests. The instrument management tool may be executed on any of a variety of devices. For example, as shown in FIG. 1, a first instance 170a of the instrument management tool executes on the instrument 112a. Additional instances of the instrument management tool may execute on the other instruments 112b-f. A second instance 170b of the instrument management tool executes on the role server 120. A third instance 170c of the instrument management tool executes on a service computer 140 coupled to the network 160. The service computer 140 may be a conventional personal computer executing an operating system such as Windows XP. Although only one service computer 140 is shown in FIG. 1, multiple service computers may be coupled to the network 160.

A user with sufficient rights (as defined in the role database 130) may use the instances 170a-c of the instrument management tool 170c to perform functions such as adding, deleting, or modifying the configuration of instruments in the instrument list 134; modifying the instrument groups 136 (such as by adding or removing groups and adding or removing instruments from existing groups), and adding, deleting, or modifying the test definitions 138.

The instance 170b of the instrument management tool executing on the role server 120 may communicate directly with the role database 130 to modify its contents. The instances 170a and 170c of the instrument management tool executing on the instrument 112a and service computer 140, respectively, may only access the database 130 indirectly by communicating over the network 160 with the role server 120, which may modify the contents of the role database 130 in response. Furthermore, the contents of the centralized users list 132 may be modified using the instrument management tools 170a-c and/or through tools provided by the underlying operating system (such as the Microsoft® Management Console).

The configuration of the instruments 112a-f and the access rights of users may therefore be managed centrally at the role server 120 and domain controller 180, thereby eliminating the redundant configuration and rights information that is present in prior art systems. At the same time, the system 100 allows users to modify instrument configurations and user access rights from any location on the network 160 at which the instrument management tool is accessible. In this way, the ability to modify instrument configurations and user access rights is distributed across the network 160, even as the management of such configurations and access rights is centralized at the role server 120. The system 100 therefore retains the benefits of both central management and distributed control.

As described above, different users of the system may have different instrument access rights. The role server 120 may, for example, maintain a set of roles 122, such as Administrator, Supervisor, Calibrator, Service Engineer, and Operator. A particular set of instrument access rights may be associated with each of the roles 122. The user list 132 may associate one or more roles with each user of the system 100. Upon authenticating the user, the user's role may be identified, and the user's access rights may be derived from the user's role. A particular user may also be granted particular rights that override the rights associated with the user's role. In effect, the role server 120 may maintain a set of user accounts for managing information about the rights of users to access the instruments 112a-f and the rights of users to perform particular operations using the instruments 112a-f.

As described above, a user may perform a test using one of the instruments 112a-f. When a test is completed, the instrument may generate test results. The test results may be required to be signed by zero, one, or two users. If the test requires two signatures, the second signer may be required to have the role of Supervisor. The instruments list 134 may specify the number and kind of signatures that are required for tests performed on each instrument. When a test is complete, the instrument may require the user to provide a electronic signature by, for example, providing a username and password. If necessary, the instrument may request a second signature from a user having the role of Supervisor. The instrument may authenticate both signatures and, if appropriate, verify that the second signature is associated with a user having the role of Supervisor. In this way, the instrument may comply with the digital signature requirements of 21 CFR Part 11.

Once the test is complete and any required signatures have been obtained, the instrument may generate a test report which includes both the test results and any electronic signatures that have been obtained. The instrument may transmit the test report over the network 160 to a central repository 150, which includes a database of test reports 152. The instrument may retain the test report in the local instrument database or delete the test report after transmitting it to the central repository 150. The instrument may print the test report to a printer, which may either be integrated into the housing of the instrument, or be an external printer connected to the instrument by a cable such as a serial or parallel cable.

Having generally described the operation of the system 100, the elements and operation of the system 100 will now be described in more detail.

Each of the instruments 112a-f may be implemented using a standard panel computer, such as the Panel 1000-370 computer available from AXIOM Technology Co., Ltd. of Taipei, Taiwan. Panel computers such as the Panel 1000-370 typically have a touchscreen display 224 and execute an embedded operating system, such as the Microsoft® Windows XP embedded operating system 202. Windows XP Embedded is the componentized version of Windows XP. It is based on the same binaries as Windows XP Professional and enables embedded developers to individually select only the features they need for customized, reduced-footprint embedded devices.

The instruments 112a-f may also include instrument management software, described in more detail below, for performing functions such as user authentication and test execution. The combination of a touch screen interface, embedded operating system, and instrument management software may be integrated into existing instruments to provide a secure interface for controlling access to the instruments 112a-f and for authenticating users. Other input devices, such as a keyboard and/or mouse, may be used in addition to or instead of the touch screen 224 to provide input to the instruments 112a-f.

One example of a test instrument that may be used as one or more of the instruments 112a-f are instruments from the Integritest® line of integrity test instruments, available from Millipore Corporation of Bedford, Mass. Integritest® test instruments test the integrity of process equipment and membrane-based separation devices in regulated and non-regulated processes in the biopharmaceutical industry. Integritest® test instruments are designed in compliance with the technical requirements of 21 CFR Part 11, including the requirements for electronic signatures. Integritest® test instruments may be used in laboratory, pilot, and manufacturing areas to test various membrane-based separation devices. Tests that may be performed by Integritest® test instruments include, for example, diffusion, bubble point (BP), enhanced bubble point (EBP), HydroCorr Water Intrusion Tests (WIT), system integrity tests (SIT), and virus diffusion tests (VDT). Integritest® test instruments may be operated by plugging them in to a power source, connecting the tubing from the device to be tested to the test instrument, selecting a test using the test instrument, and following on-screen prompts, as described in more detail below.

The domain controller 180 may be implemented as a conventional Windows server that manages Windows user information, such as usernames, passwords, and privileges. In general, a domain is a group of computers and devices on a network that are administered as a unit with common rules and procedures. Within the Internet, domains are defined by the IP address. All devices sharing a common part of the IP address are said to be in the same domain.

A server in a Windows XP network may be assigned the role of domain controller. In Windows XP, a "domain" refers to a set of network resources (such as application programs and printers) for a group of users. To gain access to a domain's resources, a user need only log in to the domain, even if the resources are located on a number of different servers in the network. The domain controller manages the master user database for the domain. Although there are both primary and backup domain controllers in Windows XP, the distinction between the two is not relevant to the present discussion. In Windows XP, a domain combines some of the advantages of a "workgroup" (a group of users who exchange access to each others' resources on different computers) and a "directory" (a group of users who are managed centrally by an administrator).

Each of the elements of the system 100, such as the instruments 112*a-f*, the service computer 140, the role server 120, and the central repository 150, may be assigned to a common Windows domain associated with the domain controller 180. Furthermore, each of the users of the system 100 may be defined in the users list 132 maintained by the domain controller 180. The domain controller 180 controls access to the Windows domain and maintains information defining the resources and users associated with the Windows domain. Therefore, when a user logs in using one of the instruments 112*a-f*, the domain controller 180 attempts to log the user in to the domain associated with the domain controller 180. Although only one domain controller 180 is shown in FIG. 1, additional domain controllers, role servers, service computers, central repositories, and instruments may be provided for use with additional domains using the techniques described herein.

The role server 120 may define user instrument access-rights for some or all of the users in the domain associated with the domain controller 180. The role server 120 therefore effectively maintains a set of user accounts which define the instrument-access rights of some or all users in the Windows domain.

The instruments 112*a-f* may operate either in domain mode or in workgroup mode, also referred to as standalone mode. When in domain mode, the instruments 112*a-f* communicate over the network 160 and otherwise operate as described above. When in workgroup mode, the instruments 112*a-f* do not communicate over the network 160. When first installed, the instruments 112*a-f* may be added to the domain associated with the domain controller 180 and may be configured to operate in workgroup mode by the Windows network administrator. Information about the instruments 112*a-f* may be defined in the role database 130 using the role server 120 or the service computer 140. The instruments 112*a-f* are then ready to operate in the manner described herein.

As mentioned above, the role server 120 centrally manages information about the instruments 112*a-f* and users of the instruments 112*a-f*, such as what instrument-access rights each user has and which tests may be performed by each of the instruments 112*a-f*. The role server 120 stores this information in the role database 130. The role server 120 may, for example, be a Windows domain controller, in which case the role server 120 may perform the functions of the domain controller 180, making the use of the separate domain controller 180 unnecessary.

The role server 120 may, for example, maintain the list of roles 122. Each of the roles 122 is associated with a particular set of rights. The roles 122 may, for example, be implemented as Windows groups with the users of the system 100 as members. The roles 122 may therefore be managed using the Microsoft® Management Console.

The rights associated with the roles 122 may include, for example, rights (referred to herein as "instrument use rights") to perform particular operations using the instruments 112*a-f*, the service computer 140, the role server 120, and the instrument management tools 170*a-c*. The rights associated with the roles 122 may also include rights (referred to herein as "instrument access rights") to access particular ones of the instruments 112*a-f*, although in the embodiments described herein instrument access rights are defined by the users list 132, instrument list 134, and instrument group list 136. Each user of the system 100 may be assigned one or more roles, thereby associating particular use and access rights with each user.

The role server 120 may provide roles that are independent of the roles or groups recognized by the underlying operating system. In one embodiment of the present invention, for example, there are five roles: Administrator, Supervisor, Calibrator, Service Engineer, and Operator. The list of roles and the rights associated with each role may be predefined and fixed. Alternatively, the role server 120 may allow users with sufficient access rights to add additional roles to the roles list 122 and to modify the access rights associated with existing ones of the roles 122.

One embodiment of the roles list 122 will now be described in more detail. In particular, in one embodiment of the present invention, the access rights associated with each of the roles 122 are as indicated in Table 1. The particular rights associated with the roles in Table 1 are provided merely for purposes of example.

TABLE 1

|  | Oper | Admin | Calibrator | Supervisor | Service Engineer |
|---|---|---|---|---|---|
| Run tests |  | X | X | X | X |
| Edit test programs |  | X | X | X | X |
| Edit filter specifications |  | X | X | X | X |
| Setup instrument |  | X | X | X | X |
| Calibrate instrument |  | X | X | X | x |
| Perform leak tests |  | X | X | X | X |
| Perform diagnostics |  | X | X | X | X |
| Setup language and logout time |  | X | X | X | X |
| Manage test data |  | X | X | X | X |
| View event logs |  | X |  | X | X |
| Access user operations | X |  |  | X | X |
| Server Lockout |  | X |  | X | X |

Figure 3A:
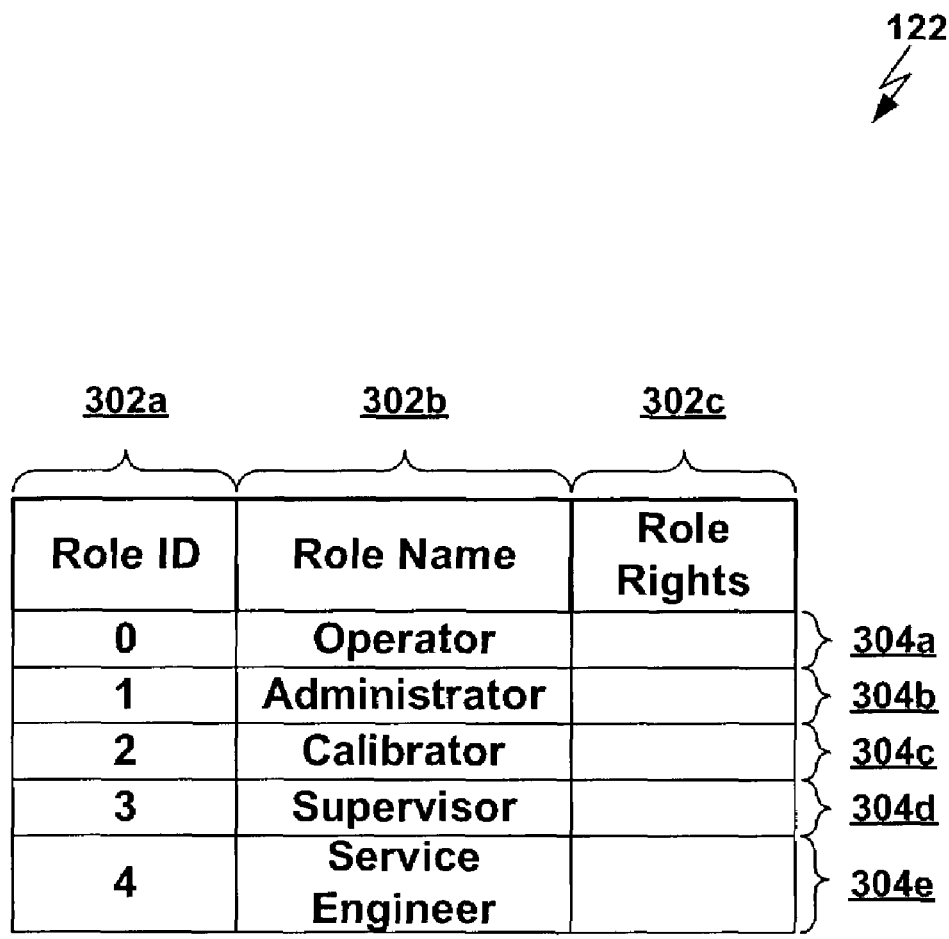
FIG. 3A is a block diagram of a roles list according to one embodiment of the present invention.

Referring to FIG. 3A, an example of the roles list 122 is illustrated according to one embodiment of the present invention. The roles list 122 includes five elements 304*a-e*, each of which corresponds to a particular role. Each of the elements 304*a-e* has a role identifier (role ID) field 302*a*, a role name field 302*b*, and a role rights field 302*c*. The values of the role ID fields 302*a* are unique identifiers which are used to refer to the elements 304*a-e*, as described in more detail below with respect to the users list 132 (FIG. 3B). The values of the role name fields 302b are text strings containing descriptive names of the roles. The values of the role rights fields 302c specify the rights associated with the corresponding role. Although the role rights fields 302c are illustrated as empty in FIG. 3A, those of ordinary skill in the art will appreciate how to specify rights, such as those illustrated in Table 1, using suitable values in the role rights fields 302c.

By way of example, element 304a has a role ID 302a of zero and a role name 302b of "Operator." Role list element 304a therefore corresponds to the Operator role, and role rights field 302c specifies the access rights associated with the Operator role. These rights may, for example, be the rights indicated in the "Operator" column of Table 1. Similarly, the element 304b specifies the rights associated with the Administrator role, the element 304c specifies the rights associated with the Calibrator role, and so on.

As mentioned above, the domain controller 180 manages users list 132, which contains information about each user of the system 100. Referring to FIG. 3B, an example of the users list 132 is shown according to one embodiment of the present invention in which five authorized users are defined in the system 100. The particular data structure illustrated in FIG. 3B is provided merely for purposes of example. The domain controller 180 may use a different data structure to implement the users 132, and the domain controller 180 may provide an Application Program Interface (API) to provide access to the information stored in the users list 132 without exposing the internal structure of the users list 132 to other elements of the system 100.

The users list 132 includes five elements 314a-e, each of which corresponds to a particular authorized user of the system 100. Each of the elements 314a-e has a user identifier (user ID) field 312a, a role ID field 312b, a user rights field 312c, a username field 312d, and a password field 312e. The values of the user ID fields 312a are unique identifiers which are used to refer to the users of the system 100, as described in more detail below. The values of the role ID fields 312b reference roles defined in the roles list 122. The values of the role rights fields 312c specify rights that should override the default rights associated with the user's role. The values of the username fields 312d specify the usernames of the corresponding users and the values of the password fields 312e specify the passwords of those users. The users list 132 may also include additional information about each user, such as his or her full name and other information needed to process electronic signatures.

By way of example, element 314a has a user ID 312a of zero and a role ID 312b of one. Referring to FIG. 3A, the Administrator role has a role ID of one (element 304b). The user specified by element 314a therefore has a role of Administrator. Similarly, the user specified by element 314b has a role of Operator. The roles of the users defined by the remaining elements 314c-e are Supervisor, Service Engineer, and Calibrator, respectively. Although each of the elements 314a-e specifies exactly one role, a particular element may specify zero or more roles. If a particular element does not specify any role, the role server 120 may apply a default role (such as Operator). If a particular element in the users list 132 specifies multiple roles, the user may be provided, for example, with the union of the rights specified by each of the multiple roles.

As described in more detail below, by default a user is provided with the rights associated with the user's role(s). For example, the user defined by element 314a has the role of Administrator, and may therefore have the access rights specified by the rights field 302c of the roles list element 304b, which corresponds to the Administrator role (FIG. 3A).

The rights field 312c of an element in the users list 132 may, however, indicate that the corresponding user should have greater or fewer rights than those associated with the user's role(s). For example, referring again to FIG. 3B, the rights field 312c of users list element 314b indicates that the corresponding user, who has a role of Operator, should additionally have the right to calibrate instruments. Similarly, the rights field 312c of user list element 314e indicates that the corresponding user, who has a role of Calibrator, should additionally have the right to perform diagnostics on instruments. Using this technique, rights may be defined on a per-user level when desired, rather than merely on a per-role level, thereby providing the system administrator with more finely-grained control over user rights.

As mentioned above, the role database 130 includes instruments list 134, which defines configuration information for each of the instruments 112a-f in the system 100. The instruments list 134 may, for example, be implemented as Windows groups with the users of the system 100 as members. The instruments list 134 may therefore be managed using the Microsoft® Management Console.

Referring to FIG. 3C, an example of the instruments list 134 is shown according to one embodiment of the present invention. The instruments list 134 includes six elements 324a-f, each of which corresponds to a particular one of the instruments 112a-f in the system 100. Each of the elements 324a-f has an instrument identifier (instrument ID) field 322a, a tests field 322b, a users field 322c, a signatures field 322d, and a report send field 322e. The values of the instrument ID fields 322a are unique identifiers which are used to refer to the instruments 112a-f, as described in more detail below.

The values of the tests fields 322b reference tests that may be performed by the corresponding instrument. The values of the test fields 322b reference tests using test identifiers (test IDs), described in more detail below with respect to FIG. 3E. The values of the users fields 322c reference users who are authorized to use the corresponding instrument. The values of the user fields 322c reference users using user IDs defined in the user ID fields 312a of the users list 132 (FIG. 3B).

The values of the signatures fields 322d specify how many signatures are required for tests performed by the corresponding instrument, and specify whether the second signature must be provided by a user having the role of Supervisor. The values of the report send fields 322e specify whether the corresponding instrument should automatically send a report of test results upon completing each test.

By way of example, element 324a has an instrument ID 322a of zero. Assume that element 324a corresponds to instrument 112a, element 324b corresponds to instrument 112b, and so on. The tests field 322b of element 324a is empty, indicating that the tests that may be performed by the corresponding instrument (i.e., instrument 112a) are defined by the instrument group 110a to which the instrument 112a belongs. Users field 322c of element 324a indicates that users having user IDs 3 and 4 are authorized to use instrument 112a in addition to the users specified by the instrument group list 136.

The meaning of the values in the instrument list 134 will be described in more detail below with respect to the instrument group list 136. In embodiments in which instrument groups are not used, the instrument list 134 may fully specify values for each of the fields 322a-e in each of the elements 324a-f. Empty fields may be provided with suitable default values.

It may be tedious and time-consuming to configure user access rights and other information for each and every instrument in the system. Furthermore, providing a distinct configuration for each of the instruments 112a-f may be inefficient if multiple ones of the instruments 112*a*-*f* share the same user access rights and other configuration information. To simplify the process of configuring the instruments 112*a*-*f*, the instrument group list 136 may be used to group the instruments into one or more logical groups. For example, referring again to FIG. 1, the instruments 112*a*-*f* are grouped into three logical groups 110*a*-*c*. Instrument group 110*a* includes instruments 112*a*-*b*, instrument group 110*b* includes instruments 112*c*-*e*, and instrument group 110*c* includes instrument 112*f*. The use of instrument groups is optional.

Referring to FIG. 3D, an example of the instrument groups list 136 is illustrated according to one embodiment of the present invention. The instruments group list 136 includes three elements 334*a*-*c*, each of which corresponds to a particular one of the instrument groups 110*a*-*c* in the system 100. Each of the elements 334*a*-*c* has a group identifier (instrument ID) field 332*a*, an instruments field 332*b*, a tests field 332*c*, a users field 332*d*, a signatures field 332*e*, and a report send field 332*f*. The values of the group ID fields 332*a* are unique identifiers which are used to refer to the instrument groups 110*a*-*c*, as described in more detail below.

The values of the instruments fields 332*b* specify which instruments are members of the corresponding instrument group. For example, assume that element 334*a* corresponds to instrument group 110*a*, element 334*b* corresponds to instrument group 110*b*, and element 334*c* corresponds to instrument group 110*c*. Instruments field 332*b* of element 334*a* indicates that instrument group 110*a* includes instruments having instrument IDs zero (instrument 112*a*) and one (instrument 112*b*). Similarly, instruments field 332*c* of element 334*b* indicates that instrument group 110*b* includes instruments having instrument IDs two (instrument 112*c*), three (instrument 112*c*), and four (instrument 112*d*). Finally, instruments field 332*c* of element 334*c* indicates that instrument group 110*c* includes the instrument having instrument ID five (instrument 112*f*). Instrument groups may include one or more instruments.

The values of fields 332*c*-*f* define properties that are applied by default to all instruments in the corresponding instrument group. For example, tests field 332*c* of element 334*a* indicates that all instruments in group zero (i.e., instruments 112*a* and 112*b*) may perform tests having test IDs zero and one. Referring again to FIG. 3C, the tests field 322*b* of element 324*a* (corresponding to instrument 112*a*) is empty. By default, however, instrument 112*a* may perform tests zero and one. Therefore, instrument 112*a* may perform tests zero and one.

The tests field 322*b* of element 324*b* (corresponding to instrument 112*b*) specifies test ID two. Therefore, instrument 112*b* may perform tests zero and one (as specified by the tests field of instrument group list element 334*a*) as well as test two (as specified by the tests field 322*b* of instruments element 324*b*).

Similarly, the users field 332*d* of instrument groups list element 334*a* specifies that all instruments in group zero (i.e., instruments 112*a* and 112*b*) are by default accessible to users having user IDs zero, one, and two. Referring again to FIG. 3C, users field 322*c* of instruments list 134 indicates that instrument 112*a* is additionally accessible to users having user IDs three and four. As a result, instrument 112*a* is accessible to users having user IDS zero and one (as specified by instrument group list element 334*a*) as well as to users having user IDs three and four (as specified by instrument list element 324*a*).

Referring again to FIG. 3D, instrument group list element 334*b* indicates that the instruments in group 110*b* (i.e., instruments 112*c*-*e*) are by default accessible to users having user IDS zero and four. Referring again to FIG. 3C, note that user field 322*c* of instrument list element 324*e* specifies a user ID of negative four. In the example illustrated in FIG. 3C, a negative user ID indicates that the instrument is to be made inaccessible to the user having a user ID that is equal to the absolute value of the specified user ID. More specifically, user field 322*c* of instrument list element 324*e* indicates that the instrument 112*e* is to be me inaccessible to the user having user ID 4. As a result, instrument 112*e* is accessible only to user zero, as specified by the combination of users field 332*b* of instrument group list element 334*b* and user fields 322*c* of instruments list element 324*e*. Similar techniques may be used to override default group values in the other fields 332*c*, 332*e*, and 332*f* of the instrument group list 136.

Signature field 322*e* of elements 334*a* and 334*b* are empty, indicating that groups 110*a* and 110*b* have no default signature requirements. Signature field 322*e* of element 334*c* indicates that group 110*c* requires one signature by default. Referring again to FIG. 3C and the signatures field 322*d* of the instruments list, it should be apparent that tests performed on instrument 112*a* require no signatures, tests performed on instrument 112*b* require one signature, tests performed on instrument 112*c* require two signatures (neither of which is required to be provided by a user with the role of Supervisor), tests performed on instrument 112*d* require two signatures (the second of which is required to be provided by a user with the role of Supervisor), tests performed on instrument 112*e* require no signatures, and tests performed on instrument 112*f* require one signature.

Referring again to FIG. 3D and the report send field 332*f* of the instrument groups list 136, instruments in group 110*a* have no default setting for reporting sending, instruments in group 110*b* are configured to automatically send test reports by default, and instruments in group 110*c* are configured to send test reports only upon manual instruction from the user. The interaction between the report send field 332*f* of the instrument groups list 136 and the report send field 322*e* of the instrument list 134 should be apparent based on the description above.

The role database 130 also includes test definitions list 138, which defines tests that may be performed by instruments 112*a*-*f*. Referring to FIG. 3E, an example of the test definitions list 138 is shown according to one embodiment of the present invention. The test definitions list 138 includes six elements 344*a*-*f*, each of which corresponds to a particular test. Each of the elements 344*a*-*f* has a test identifier (test ID) field 342*a*, a test name field 342*b*, and a test sequence field 342*c*. The values of the test ID fields 342*a* are unique identifiers which are used to refer to the test definition list elements 344*a*-*f*, as described above. For example, the test IDs in tests field 322*b* (FIG. 3C) and test field 332*c* (FIG. 3D) refer to test definitions list element 344*a*-*e* using values in the test ID fields 342*a*. Although the test sequence fields 342*c* are illustrated as empty in FIG. 3E, those of ordinary skill in the art will appreciate how to provide suitable values in such fields for defining test sequences.

The term "service computer" refers herein generally to a computer from which information stored in the role database 130 may be accessed and modified. For example, referring to FIG. 1, a single service computer 140 coupled to the network 160 is shown. In practice, domain controller 180, service computer 140, and role server 120 may be combined into a fewer number of computers or further separated into additional computers for performing the same functions. Furthermore, there may be multiple service computers coupled to the network 160. The instrument management tool 170*c* executing on the service computer 140 provides an interface through which a user may access and modify information stored in the role database 130.

The service computer 140, like the instruments 112a-f and the role server 120, may execute any suitable operating system, such as Windows XP. The service computer 140 may be configured to be part of the Windows domain associated with the domain controller 180. Access to the service computer 140 may be limited to authorized users using the techniques described above with respect to limiting access to the instruments 112a-f. The same logon process may be used.

The central repository 150 centrally stores test reports 152 generated by the instruments 112a-f. Although only one central repository 150 is shown in FIG. 1, there may be more than one central repository. Furthermore, although the central repository 150 is illustrated in FIG. 1 as a database, it should be appreciated that the central repository 150 may be implemented in any of a variety of ways, such as a combination of a database server coupled to the network 160 and a data store managed by the database server. Furthermore, the central repository 150, domain controller 180, service computer 140, and role server 120 may be further combined or separated into a lesser or greater number of computers for performing the same functions.

Figure 2A:
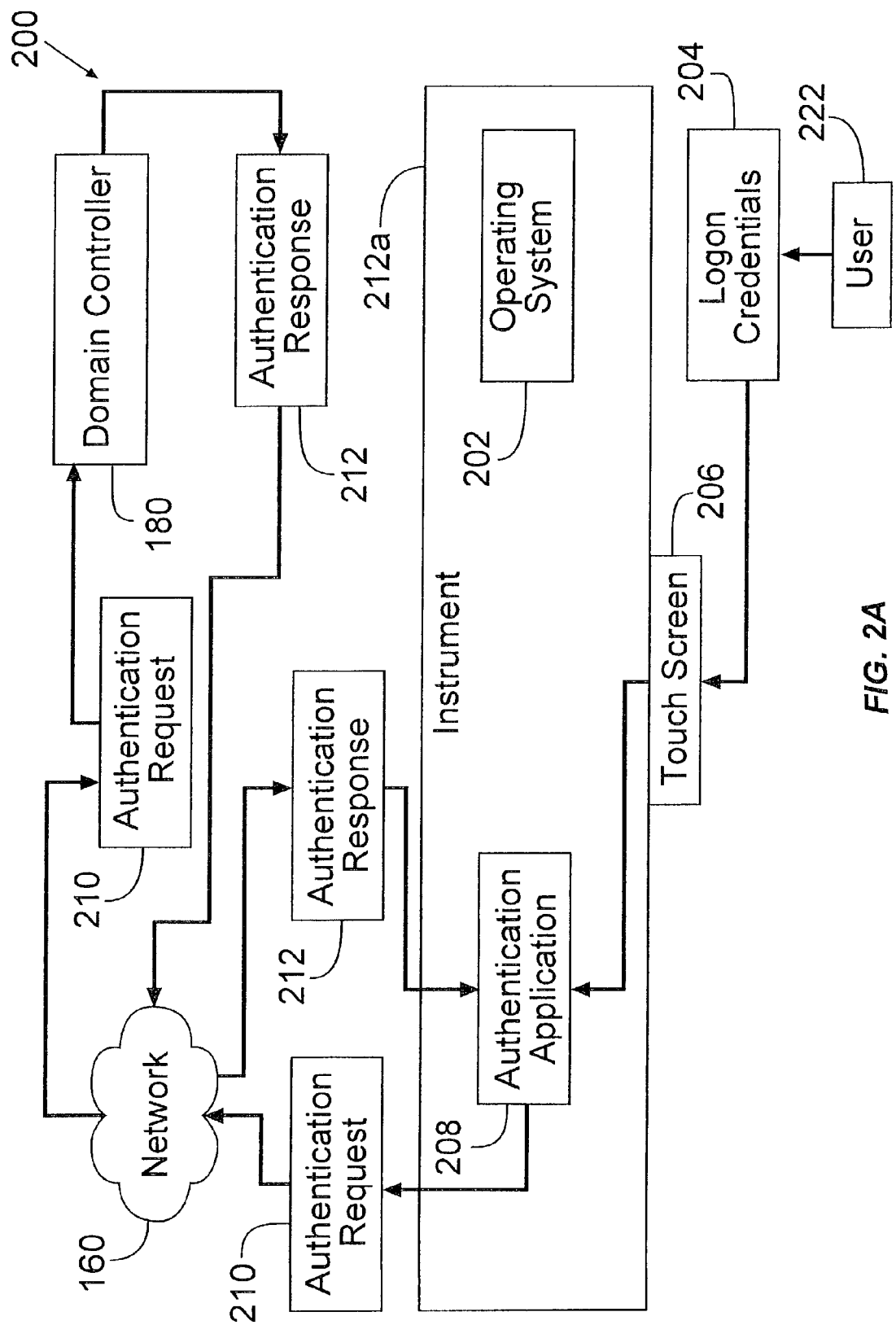
FIG. 2A is a dataflow diagram of operations performed in conjunction with a first part of a logon process according to one embodiment of the present invention.

The process of logging on to one of the instruments 112a-f will now be described in more detail. For purposes of example, the process will be described with respect to instrument 112a, although the same process is applicable to the other instruments 112b-f. Referring to FIG. 2A, a dataflow diagram 200 is shown of operations that may be performed in conjunction with a first part of the logon process. Only relevant elements of the system 100 (FIG. 1) are illustrated in FIG. 2A for ease of illustration.

Figure 4A:
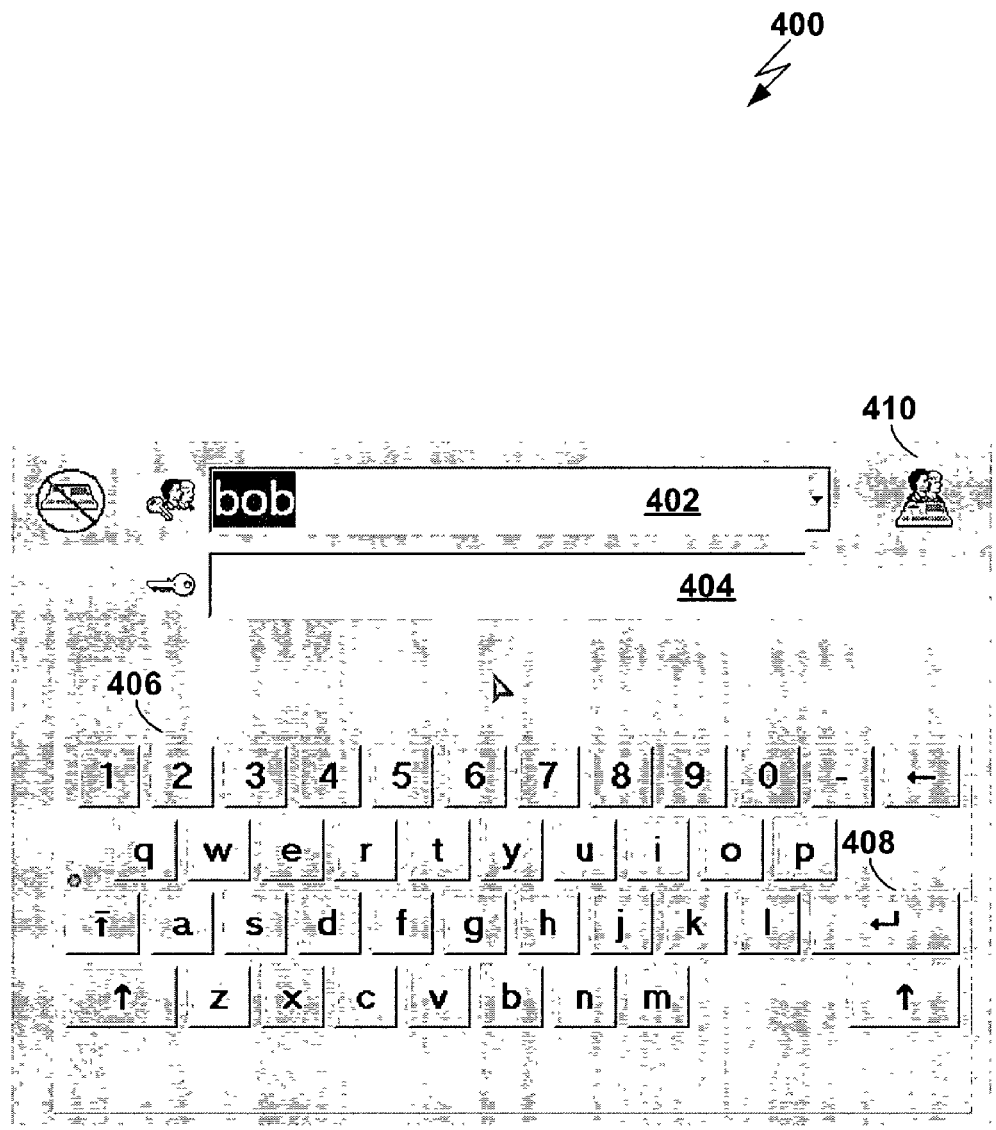
FIG. 4A is a diagram of a logon screen according to one embodiment of the present invention.
Figure 4B:
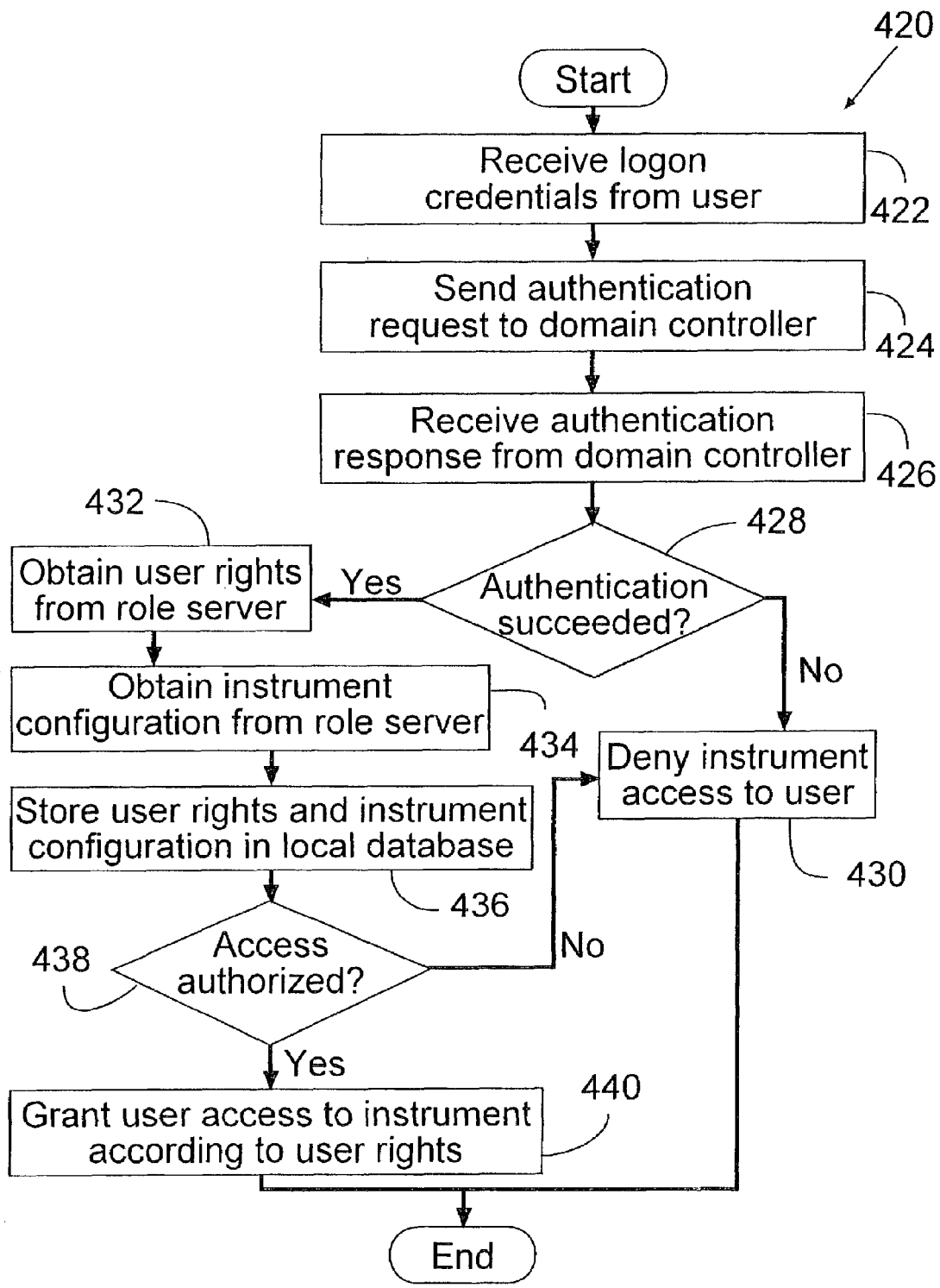
FIG. 4B is a flowchart of a method for performing a first part of a logon process according to one embodiment of the present invention.

When the instrument 112a is booted up, it may present a user 222 with a customized logon screen rather than the conventional Windows logon screen. Referring to FIG. 4A, an example of such a logon screen 400 is shown. Referring to FIG. 4B, a flowchart is shown of a method 420 that may be performed by an authentication application 208 executing on the instrument 112a to perform the logon process.

The user 222 is required to enter logon credentials 204 using the logon screen 400 in order to obtain access to the instrument 112a. The authentication application 208 receives logon credentials 204 from the user 222 through touch screen 206 (step 422). The user 222 may, for example, provide the credentials 204 in the form of a username and password. The logon screen 400 includes a first text field 402 into which the user 222 may enter a user name and a second text field 404 into which the user 222 may enter a password. The user 222 may input a username and password into the text fields 402 and 404 using a touch screen 206 to enter characters through a soft keyboard 406. Upon entering the logon credentials 204 the authentication application 208 transmits an authentication request 210 over the network 160 to the domain controller 180 (step 424). The network 160 may, for example, be a TCP/IP network. The domain controller 180 attempts to authenticate the user 222 based on the logon credentials 204 and transmits an authentication response 212 over the network 160 to the authentication application 208. The authentication response 212 indicates whether the authentication succeeded or failed. If, for example, the domain controller 180 is a Microsoft Windows domain controller, the authentication process is performed using the Windows authentication mechanism.

The authentication application 208 receives the authentication response 212 from the domain controller 180 (step 426) and determines, based on the contents of the authentication response 212, whether the authentication succeeded or failed (step 428). If the authentication failed, the authentication application 208 denies instrument access to the user 222 (step 430). The instrument 112a does not provide the user 222 with access to the desktop or other features of the operating system 202 (such as Windows XP) executing on the instrument 112a. As a result, the user 222 may only gain access to the instrument 112a if the user's credentials 204 are authenticated.

Figure 2B:
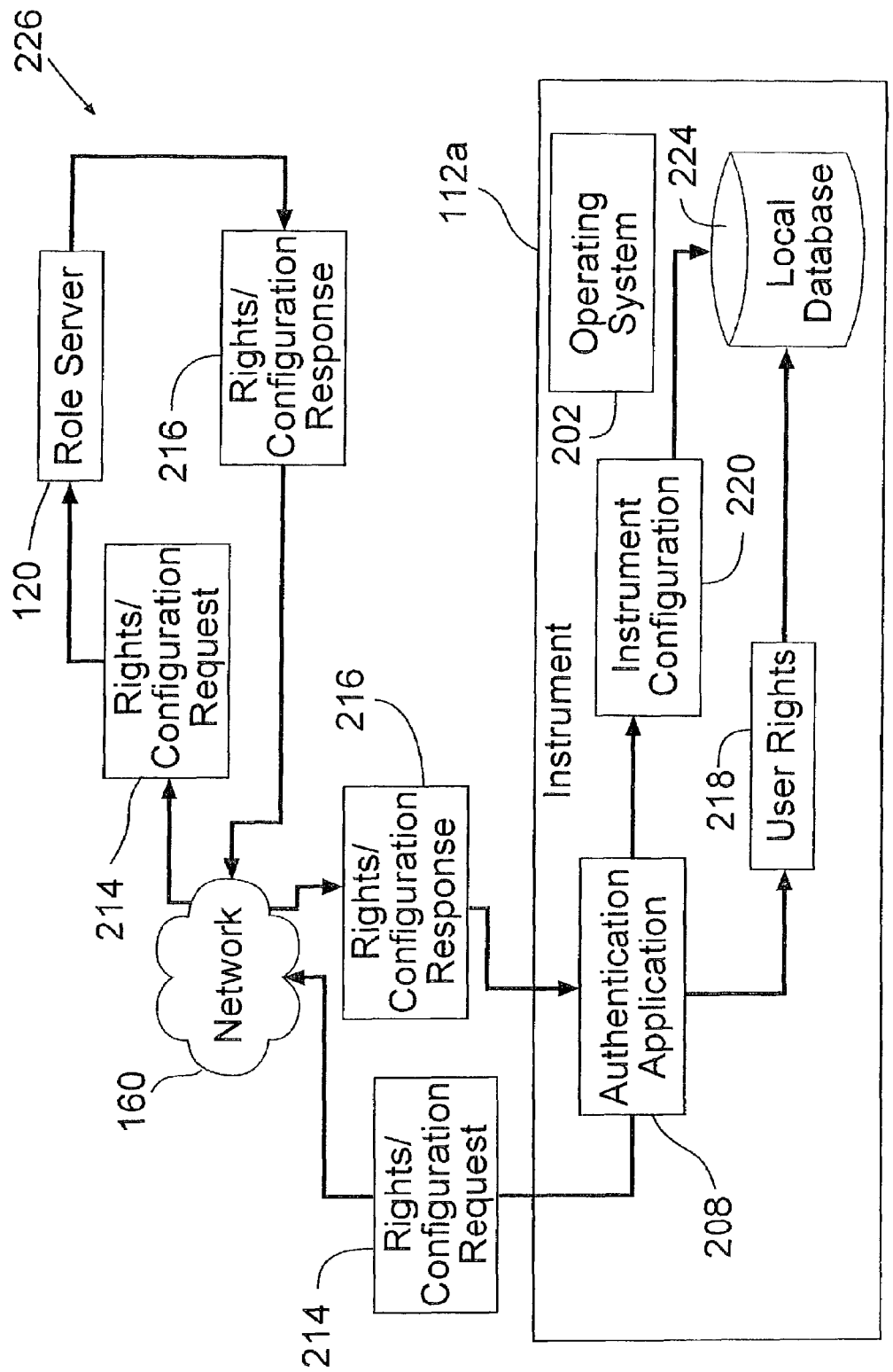
FIG. 2B is a dataflow diagram of operations performed in conjunction with a second part of a logon process according to one embodiment of the present invention.

Referring to FIG. 2B, for example, a dataflow diagram 226 is shown of operations that may be performed in conjunction with a second part of the logon process that is performed when user authentication has succeeded. If the authentication succeeded, the authentication application 208 obtains some or all of the user's rights with respect to the instrument 112a from the role server 120 (step 432). The authentication application 208 also obtains the instrument configuration from the role server 120 (step 434).

For example, referring to FIG. 2B, the authentication application may send a request 214 over the network 160 to the role server 120 for the user's rights and for the instrument's configuration. The role server 120 may extract the requested information from the role database 130 (as described in more detail below with respect to FIG. 4C) and transmit the extracted information to the authentication application 208 over the network 160 in a response 216. The authentication application 208 may extract the user rights 218 and instrument configuration 220 from the response 216 and store them in a local instrument database 224 for subsequent use (step 436).

The authentication application 208 determines, based on the user's rights 218 and the instrument configuration 220, whether the user 222 has the right to access the instrument 112a (step 438). If the user 222 does not have the right to access the instrument, access to the instrument 222 is denied to the user 222 (step 430). Otherwise, the instrument 112a grants the user 222 rights to perform functions using the instrument 112a in accordance with the user rights 218 and the instrument configuration 220 (step 440).

Figure 4C:
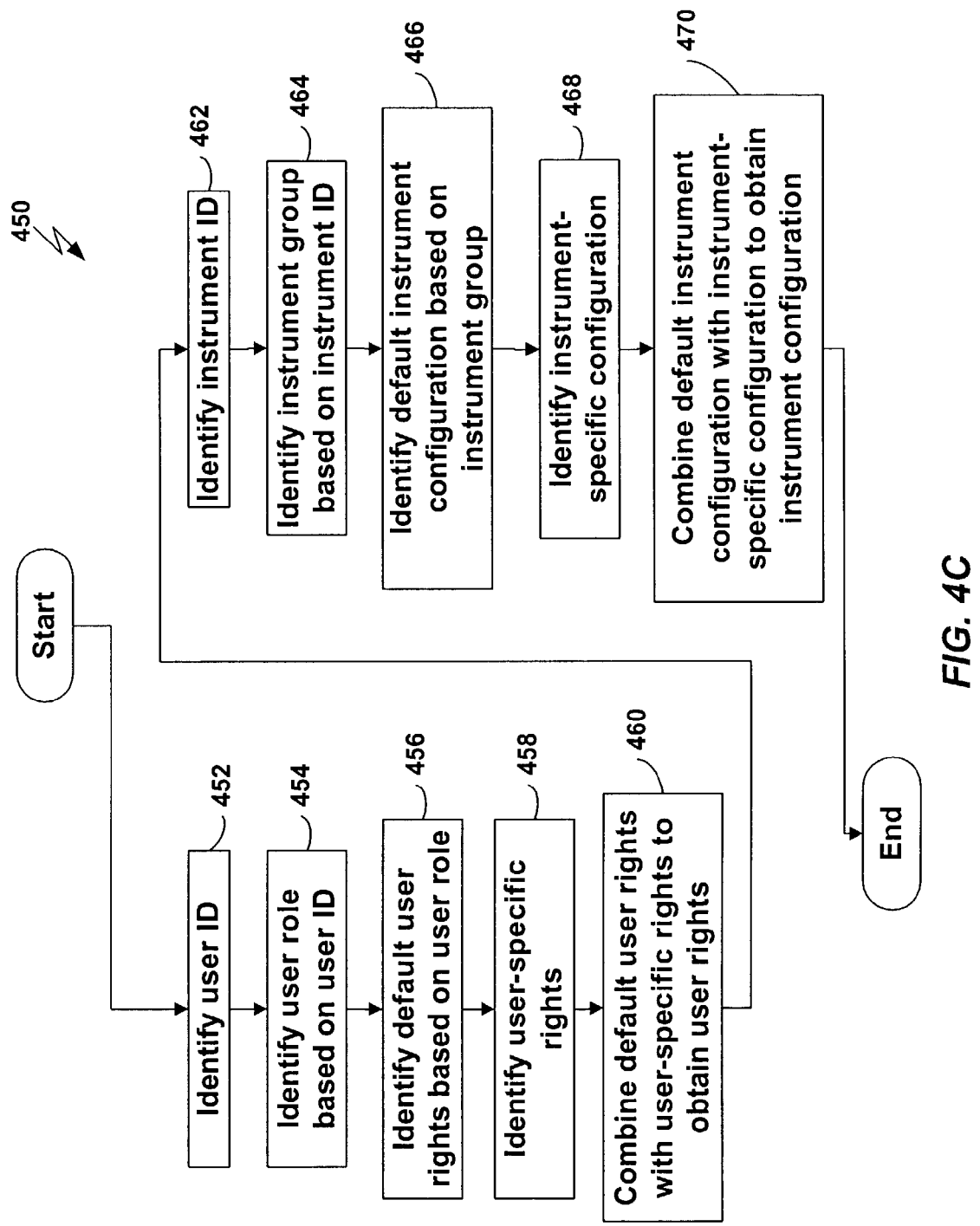
FIG. 4C is a flowchart of a method performed to generate a response to a request for information descriptive of user rights and an instrument configuration according to one embodiment of the present invention.

Referring to FIG. 4C, a flowchart is shown of a method 450 that may be performed by the role server 120 to generate the response 216 described above with respect to FIG. 2B. The method 450 identifies the user's user ID (step 452). The authentication application 208 may receive the user ID from the domain controller 180 upon successful authentication. The authentication application may then include the user ID in the request 214, from which the role server 120 may extract the user ID. The role server 120 identifies the user's role based on the user ID (step 454). The role server 120 may identify the user's role by using the user ID as an index into the users list 132 and identifying the value of the role field 312b (FIG. 3B) of the users list element corresponding to the user ID.

The role server 120 identifies the default user rights based on the user's role (step 456). The role server 120 may identify the default user rights by using the role ID identified in step 454 as an index into the roles list 122 and identifying the value of the role rights field 302c (FIG. 3A) of the roles list element corresponding to the role ID. The role server 120 identifies any user-specific rights associated with the user 222 (step 458). The role server 120 may identify such user-specific rights, if any, by using the user ID identified in step 452 as an index into the users list 132 and identifying the value of the user rights field 312c (FIG. 3B) of the users list element corresponding to the user ID.

The role server 120 may then obtain the user's rights by combining the default user rights identified in step 456 with the user-specific rights, if any, identified in step 458 (step 460). As described above, the user-specific rights specified in the user rights field 312c of the users list 132 may indicate that a particular user is to have either greater or fewer rights than those associated with the user's role. The user rights obtained in step 460 are the user rights that the role server 120 transmits to the authentication application 208 in the response 216 (FIG. 2B).

The role server 120 obtains the instrument configuration as follows. The method 450 identifies the instrument ID of the instrument 112a (step 462). The authentication application 208 may include the instrument ID in the request 214, from which the role server 120 may extract the user ID. The instrument ID may, for example, be stored in the local database 224 or may be hardwired or otherwise permanently stored in the instrument 112a (e.g., in a ROM or PROM).

The role server 120 identifies the instrument's instrument group based on the instrument ID (step 464). The role server 120 may identify the instrument's group by searching the instruments fields 332b of the elements 334a-c in the instrument group list 136 (FIG. 3D), and identifying the value of the group ID field 332a of the element which lists the instrument's instrument ID in field 332b.

The role server 120 identifies the default instrument configuration based on the instrument's group (step 466). The term "instrument configuration" refers to some or all of the properties associated with a group in the instrument list 136. For example, in the group list 136 illustrated in FIG. 3D, the instrument configuration associated with a particular group includes the values of the group's test field 332c, users field 332d, signatures field 332e, and report send field 332f.

The role server 120 identifies any instrument-specific configuration associated with the instrument 112a (step 468). The role server 120 may identify such an instrument-specific configuration, if any, by using the instrument ID identified in step 462 as an index into the instruments list 134 (FIG. 3C) and identifying the values of the tests field 322b, users field 322c, signatures field 322d, and report send field 322e of the instruments list element corresponding to the instrument ID.

The role server 120 may then obtain the instrument's configuration by combining the default instrument configuration identified in step 466 with the instrument-specific configuration, if any, identified in step 468 (step 470). The instrument configuration obtained in step 470 is the instrument configuration that the role server 120 transmits to the authentication application 208 in the response 216 (FIG. 2B).

Referring again to FIGS. 3C and 3D, the tests fields 322b and 332c of the instruments list 134 and instrument group list 136, respectively, list test IDs. As described above, the test IDs may be used as indices into the test definitions list 138 to obtain the test sequences 342c associated with particular tests (FIG. 3E). The role server 120 may transmit (in the response 216) either test IDs or the actual test sequences to the instrument 112a. If the role server 120 transmits test IDs to the instrument 112a, the instrument 112a may download the actual test sequences at a subsequent time, such as when a particular test is executed. Alternatively, if the role server 120 transmits actual test sequences to the instrument 112a, the test sequences may be included in the instrument configuration 220 and stored in the instrument's local database 224.

Figure 5:
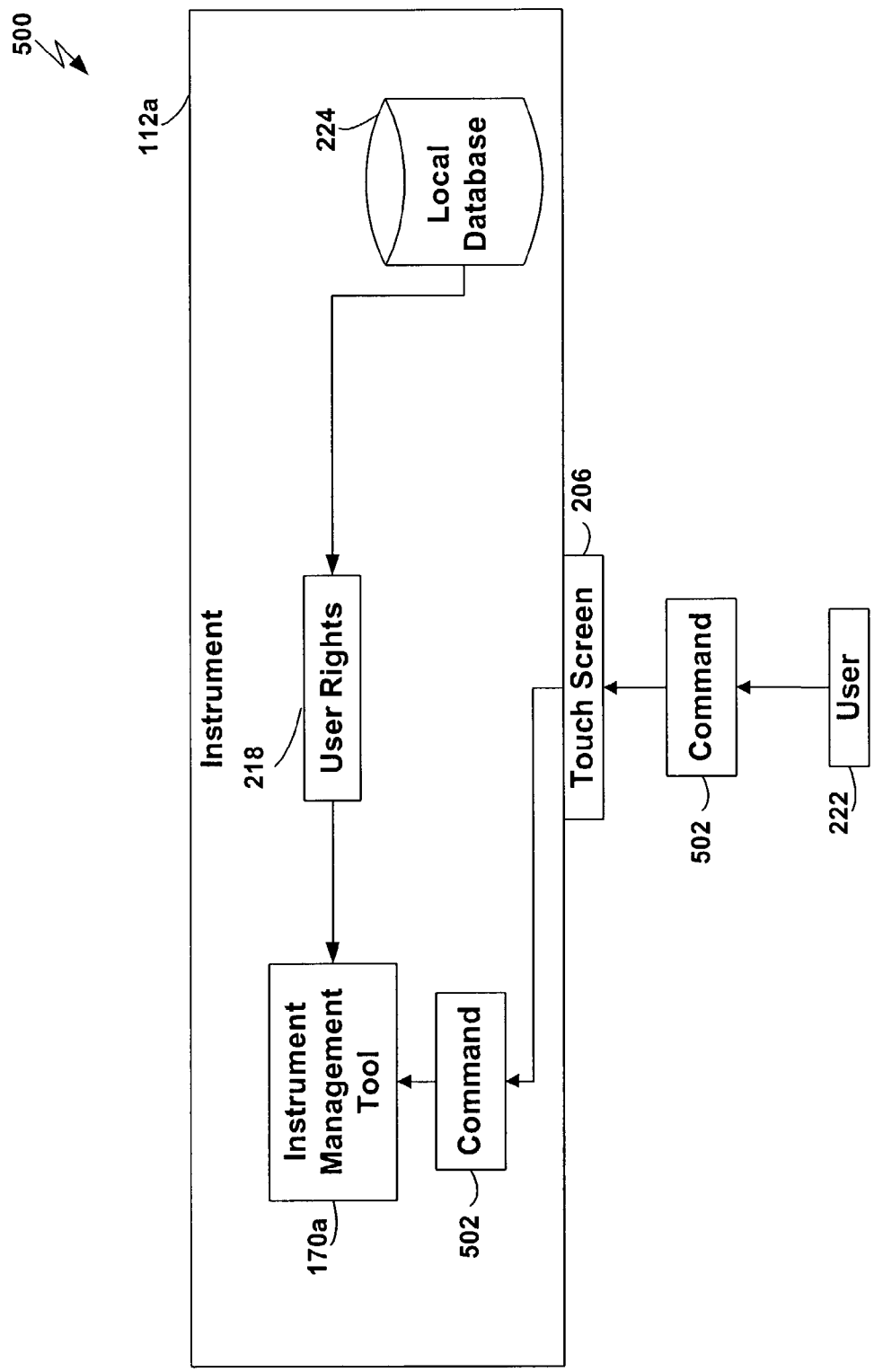
FIG. 5 is a dataflow diagram of operations performed by an instrument to execute a user-provided command according to one embodiment of the present invention.

Referring to FIG. 5, once the user 222 has been successfully authenticated (FIG. 4B), the instrument 112a may execute the instrument management tool 170a. The instrument management tool 170a may, for example, be a software program that allows the user 222 to perform various operations, such as viewing and backing up test reports, configuring the network connectivity of the instrument 112a, performing instrument diagnostics, and calibrating the instrument 112a. The user's rights 218 determine which particular operations the user 222 is permitted to perform. The instrument management tool 170a may provide an appropriate user interface, such as a graphical user interface, through which the user 222 may provide input and receive output. Techniques for providing such an interface and for accessing a remote database over a network are well-known to those of ordinary skill in the art. The instrument management tool 170a may be further divided into additional software programs or combined with other software programs described herein.

Figure 6:
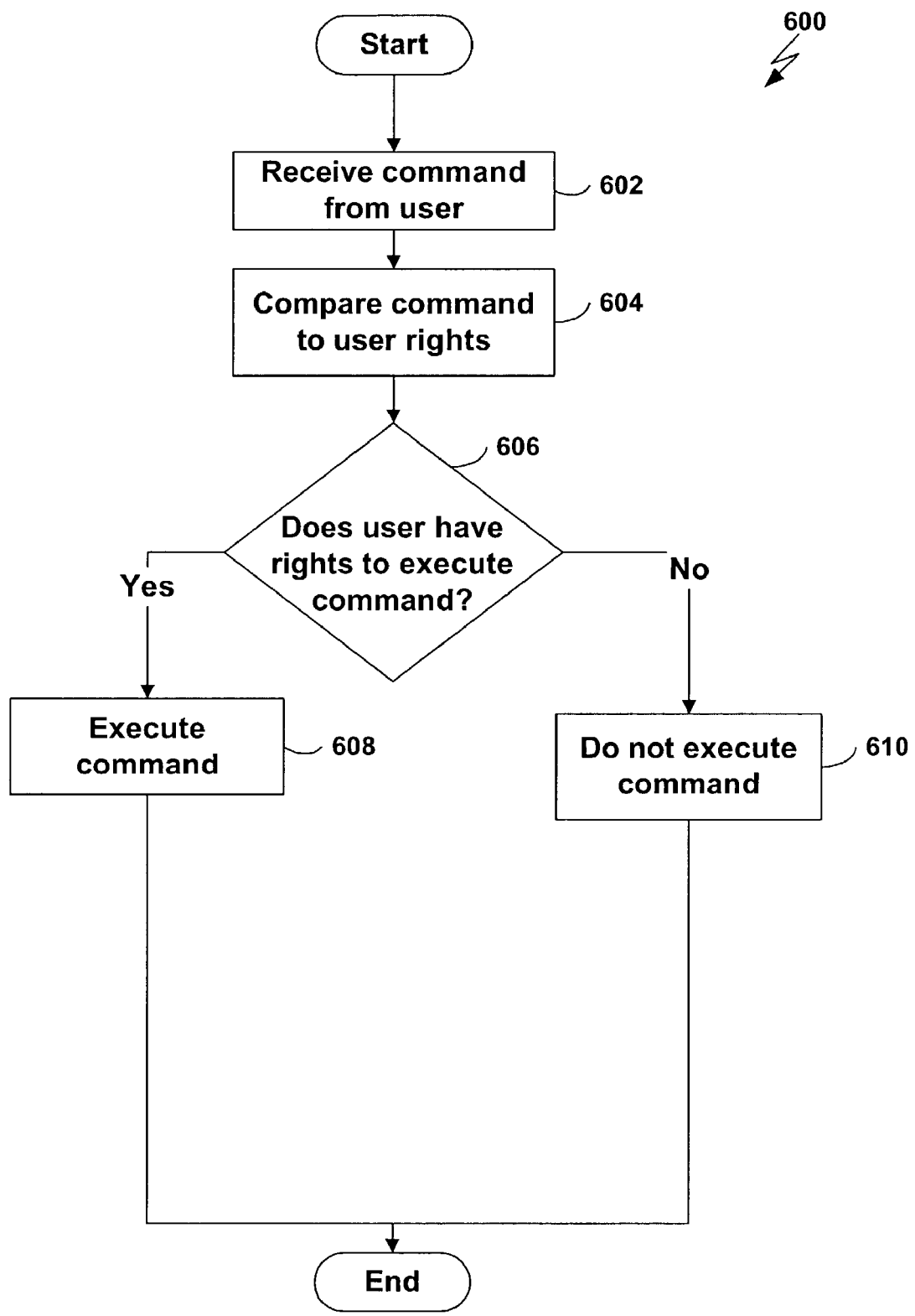
FIG. 6 is a flowchart of a method for enforcing user instrument-use rights according to one embodiment of the present invention.

Referring to FIG. 6, a flowchart is shown of a method 600 that is performed by the instrument management tool 170a in one embodiment of the present invention to allow the user 222 to perform only those operations which the user has the right to perform. The method 600 receives a command 502 from the user 222 through the touch screen 206 (step 602). The method 600 compares the command to the commands specified by the user rights 218 (step 604). As described above, the user rights 218 may include a list of commands which the user 222 has the right to perform.

The method 600 determines, based on the comparison performed in step 604, whether the user 222 has the right to execute the command 502 on the instrument 112a (step 606). The method 600 may make this determination by determining whether the command 502 is in the list of commands contained in the user rights 218. If the user 222 does not have the right to execute the command 502, the instrument management tool 170a does not execute the command 502 (step 610). If the user 222 has the right to execute the command 502, the instrument management tool 170a executes the command 502 (step 608).

Alternatively, the instrument management tool 170a may present the user 222 with an interface that only allows the user 222 to enter commands which the user 222 has the right to execute. For example, the instrument management tool 170a may provide a graphical user interface displaying a menu which only contains menu choices corresponding to commands that the user 222 has the right to execute. As a result, the user 222 is prevented from executing commands on the instrument 112a which the user does not have the right to execute.

Figure 7A:
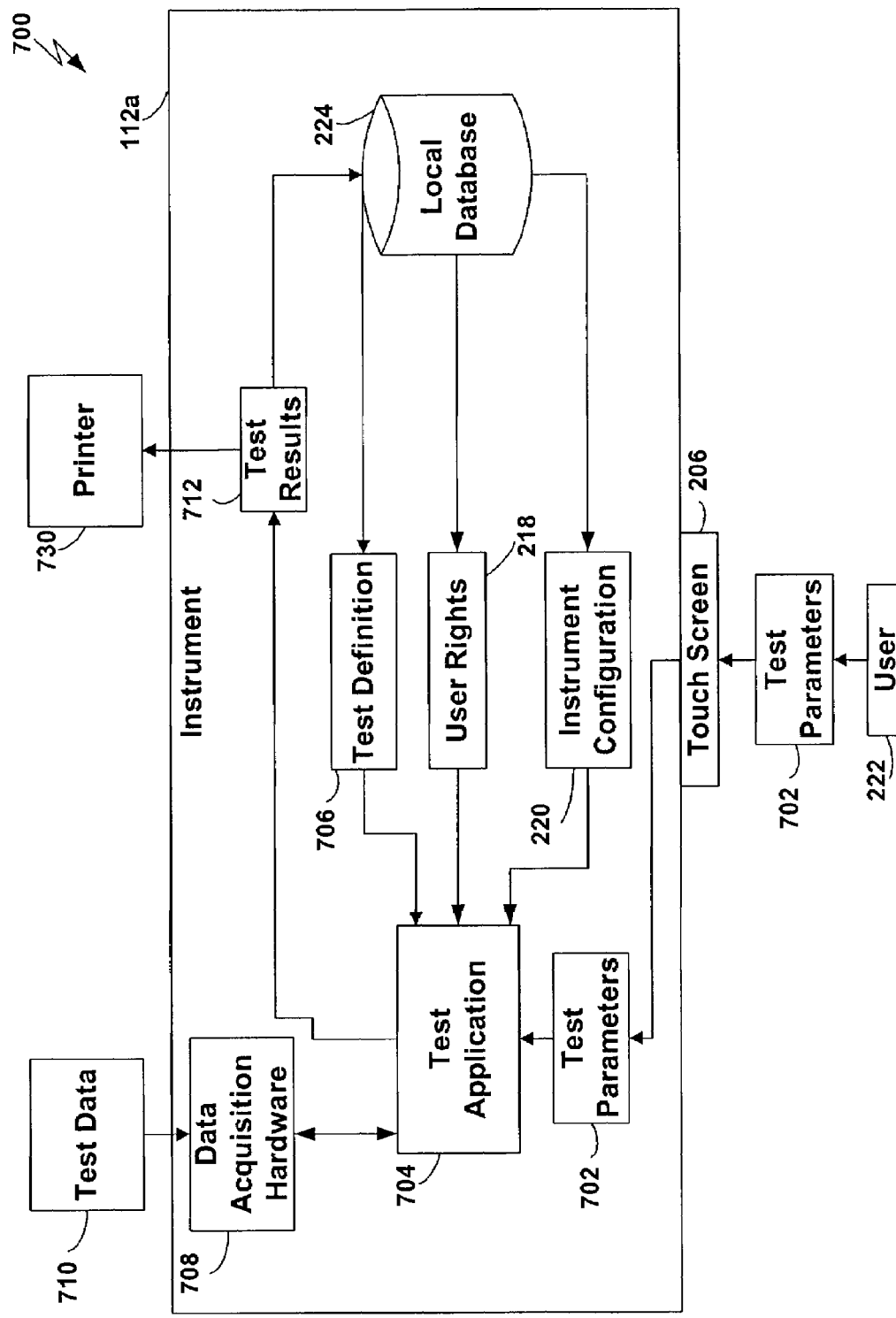
FIG. 7A is a dataflow diagram of operations performed by an instrument to perform a test according to one embodiment of the present invention.
Figure 8A:
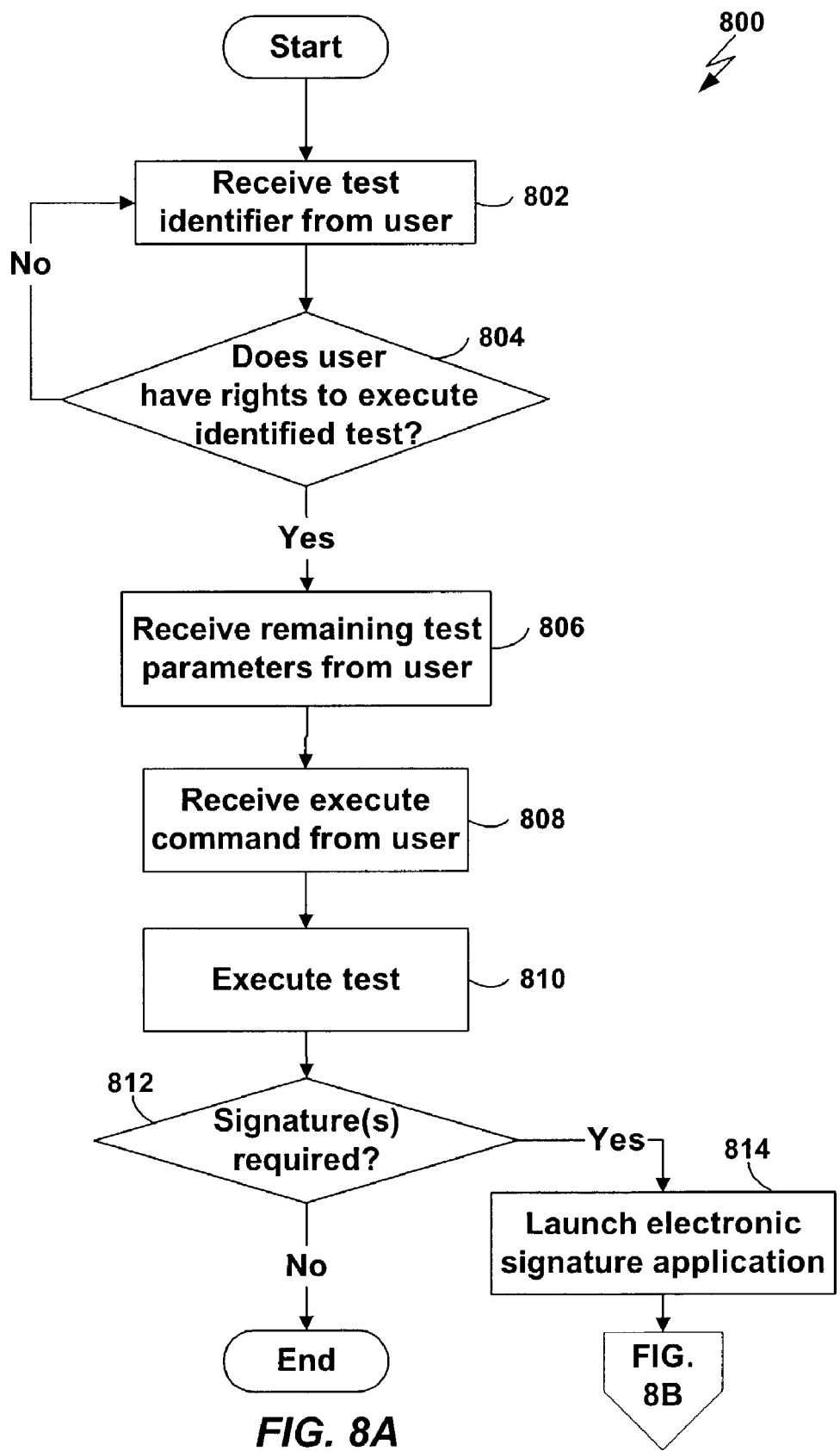
FIG. 8 is a flowchart of a method for performing a test on an instrument according to one embodiment of the present invention.

Once the user 222 has logged in to the instrument 112a, the user 222 may perform tests using the instrument 112a if the user 222 has the right to perform tests on the instrument 112a. For example, referring to FIG. 7A, a dataflow diagram 700 is shown of operations that may be performed by the instrument 112a to perform a test. Referring to FIG. 8A, a flowchart is shown of a method 800 that may be performed by test application software 704 executing on the instrument 112a to perform a test. The user 222 may cause the instrument 112a to execute the test application 704 by, for example, issuing a "perform test" command to the instrument management tool 170a (FIG. 5).

Figure 9A:
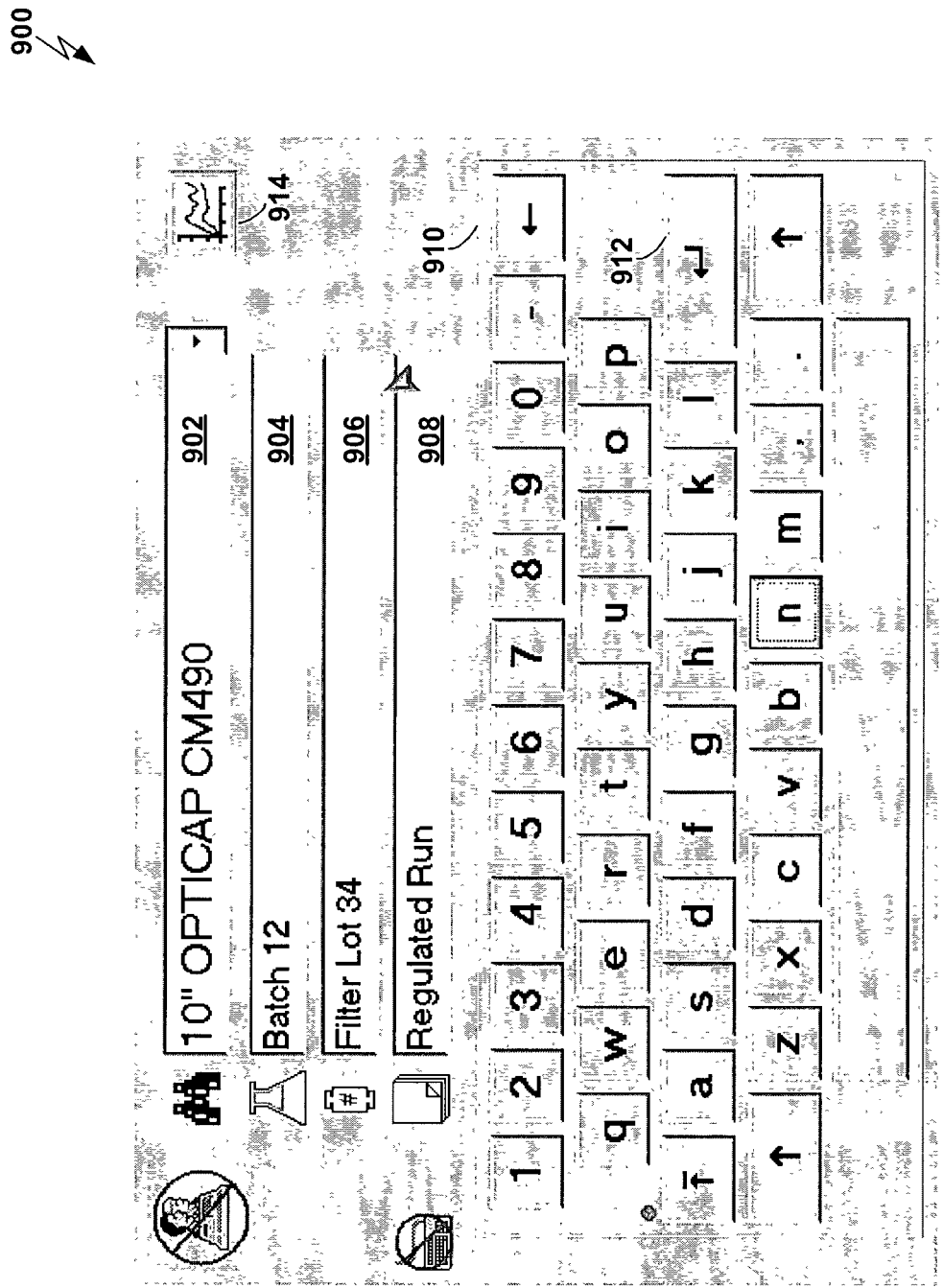
FIGS. 9A-9E are diagrams of user interfaces used by an instrument to receive information from a user about a test and display test information to the user according to one embodiment of the present invention.

Referring to FIG. 8A, the method 800 receives a test identifier from the user 222 (step 802). As described in more detail below, the test identifier may be one of several test parameters 702 (FIG. 7A) that the user 222 provides to the instrument 112a through the touch screen 206 to perform the test. For example, referring to FIG. 9A, a diagram is shown of a dialog box 900 that the instrument 112a may display on the touch screen 206 and through which the user 222 may provide the test parameters 702.

The dialog box 900 includes a first text field 902 in which the user 222 may provide the test identifier, such as a text string identifying the name of a test. In one embodiment, the text field 902 displays a drop-down list of test names when the user 222 touches the text field 902. The test names in the drop-down list may be limited to the names of those tests which the user 222 has the right to perform on the instrument. The test application 704 may identify the list of tests which the user 222 has the right to perform by, for example, extracting and examining the user rights 218 and/or the instrument configuration 220 from the local database 224. In this way, the user 222 is limited to performing those tests which the user 222 has the right to perform.

Alternatively, for example, the test application 704 may allow the user 222 to type in the test name using a soft keyboard 910. The test application 704 may then determine whether the user 222 has the right to perform the test identified by the test name (step 804) and only allow the user 222 to proceed if the user 222 has the right to perform the specified test.

Once the user 222 has provided an acceptable test name, the test application 704 receives additional test parameters 702 from the user 222 (step 806). Such parameters 702 may include, for example, a batch number (entered into text field 904), a filter lot number (entered into text field 906), and a test description (entered into text field 908). The user 222 may cause the test to execute by touching an enter key 912 or an execute button 914 (step 808).

In response to receiving the execute command from the user 222, the instrument 112a executes the specified test using the parameters 702 (step 810). The test application 704 performs the test by extracting the test definition 706 for the test from the local database 224 (or by retrieving the test definition from the role server 120 over the network 160) and performing the steps specified in the test definition 706. The instrument 112a includes data acquisition hardware 708 that may be used to perform the test and to receive test data 710 from external sources. In the course of performing the test, the test application generates test results 712.

Once the test has been performed and the test results 712 generated, the test results 712 may be required to be signed. As described above, a particular instrument may require no signatures, one signature, or two signatures for each test performed on the instrument. Furthermore, the second signature for a test requiring two signatures may be required to be provided by a user having the role of Supervisor. The test application 704 determines whether any signatures are required by extracting the instrument configuration 220 from the local database 224 and examining the signatures field of the instrument configuration (step 812).

If no electronic signatures are required, the test application 704 terminates. Prior to terminating, the test application 704 may store the test results 712 in the local database 224. Furthermore, if the instrument configuration 220 indicates that test reports are to be transmitted automatically to the central repository 150 (FIG. 1), the test application 704 may transmit the test results 712 over the network 160 to the central repository 150. The test application 704 may also provide the user 222 with the option to print the test results 712 to a printer 730 and to transmit the test results 712 to the central repository 150 manually, as described below with respect to FIG. 9E.

If the test application 704 determines that the test results 712 are required to be signed by at least one electronic signature, the test application 704 may launch an electronic signature application to receive one or more electronic signatures from the user 222 (step 814). Alternatively, however, the test application 704 may provide the user 222 with the option of deferring the provision of electronic signatures until a subsequent time, in which case the user 222 will not be allowed to transmit the test results 712 to the central repository 150 or print the test results 712 until the test results have been signed.

Figure 7B:
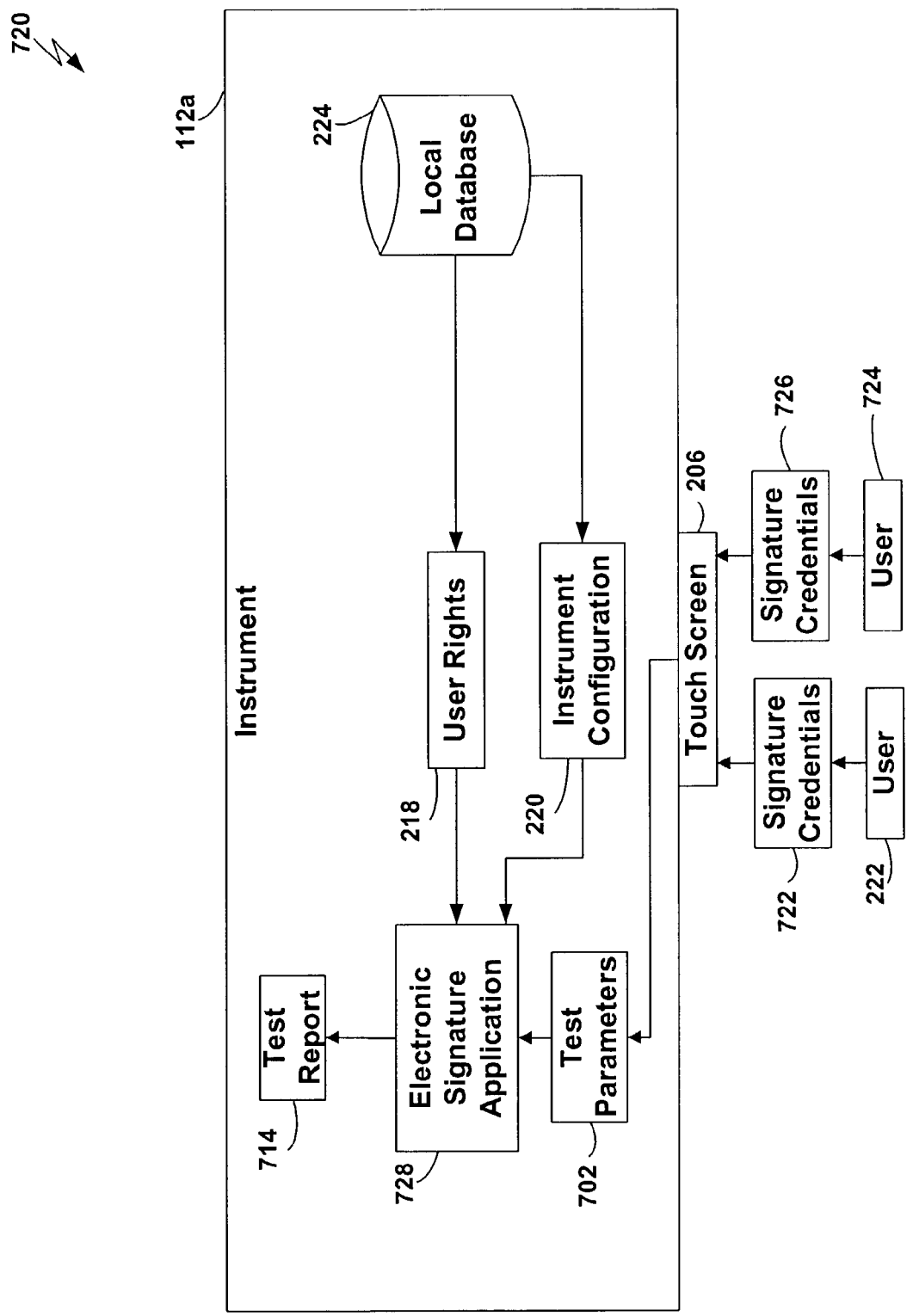
FIG. 7B is a dataflow diagram of operations performed by an instrument to obtain electronic signatures for a test according to one embodiment of the present invention.
Figure 8B:
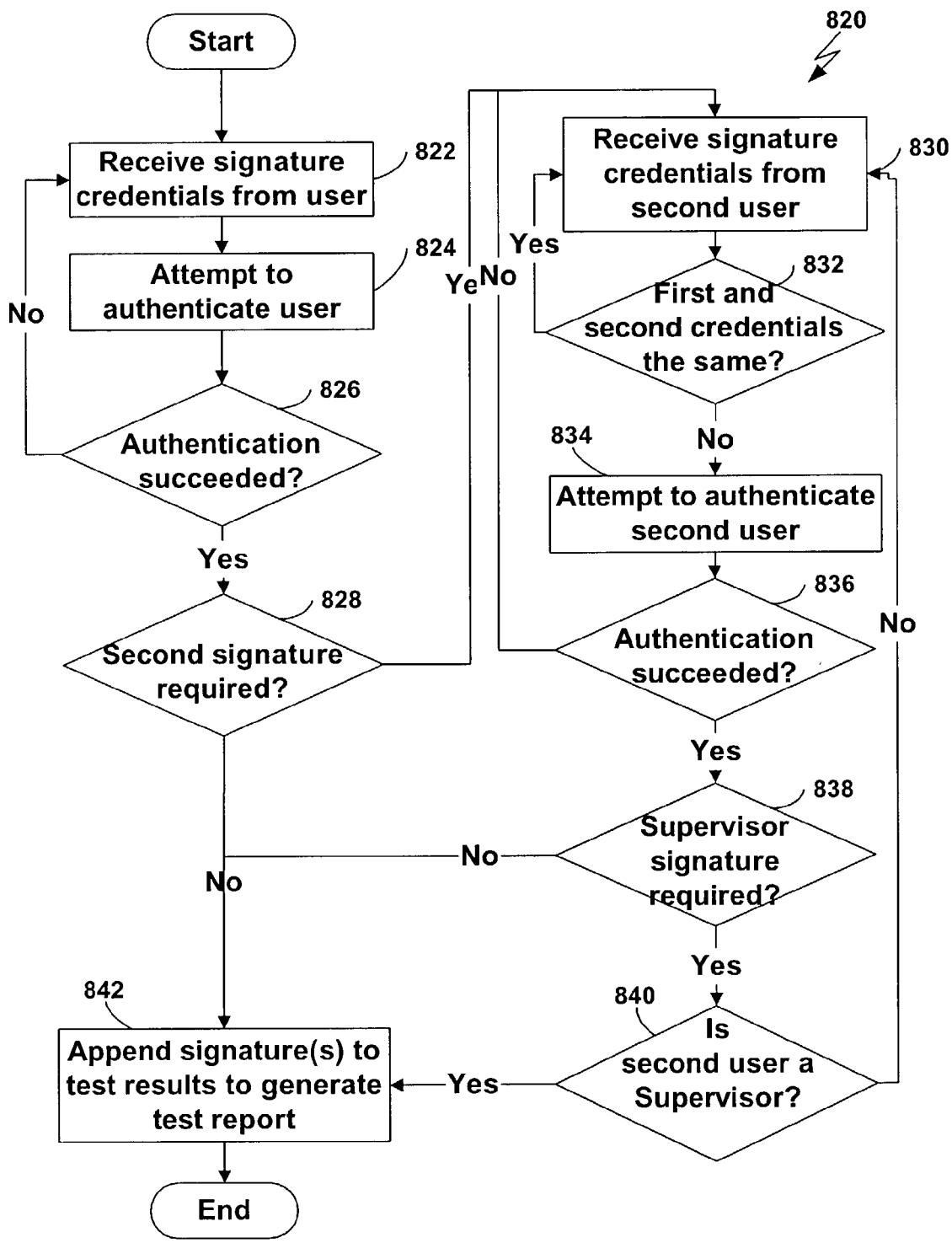

Referring to FIG. 7B, a dataflow diagram 720 is shown of operations that may be performed by the instrument 112a to obtain electronic signatures using an electronic signature application 728. Referring to FIG. 8B, a flowchart is shown of a method 820 that may be performed by an electronic signature application 720 executing on the instrument 112a to obtain one or more electronic signatures.

Figure 9B:
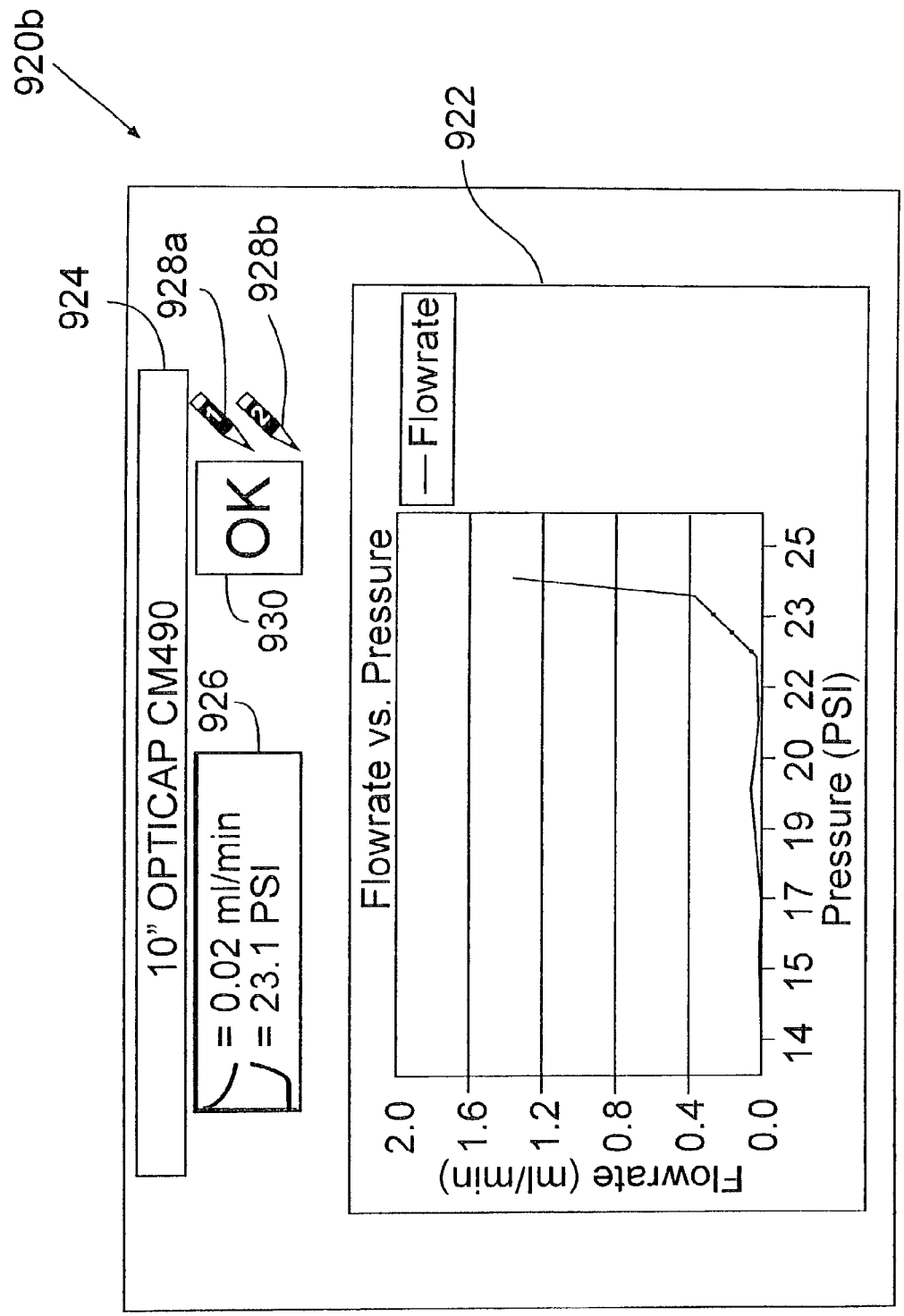

The method 820 receives signature credentials from the user 222 (step 822). For example, referring to FIG. 9B, a diagram is shown of a window 920a that the instrument 112a may display upon completion of the test performed using the parameters shown in FIG. 9A. The window 920a includes a graph 922 illustrating the test results 712, a title bar 924 displaying the name of the test, a legend 926 explaining the meaning of symbols in the graph 922, a first signature button 928a, a second signature button 928b, and an OK button 930.

To enter a first signature, the user 222 may press the first signature button 928a. If two signatures are required, the user 222 may press the first signature button 928a to enter a first signature and then press the second signature button 928b to enter a second signature. Alternatively, the user 222 may be allowed to enter the first and second signatures in either order. In the present example, however, it is assumed that the user 222 is required to enter the first and second signatures in sequence and that the user 222 presses the first signature button 928a first.

Figure 9C:
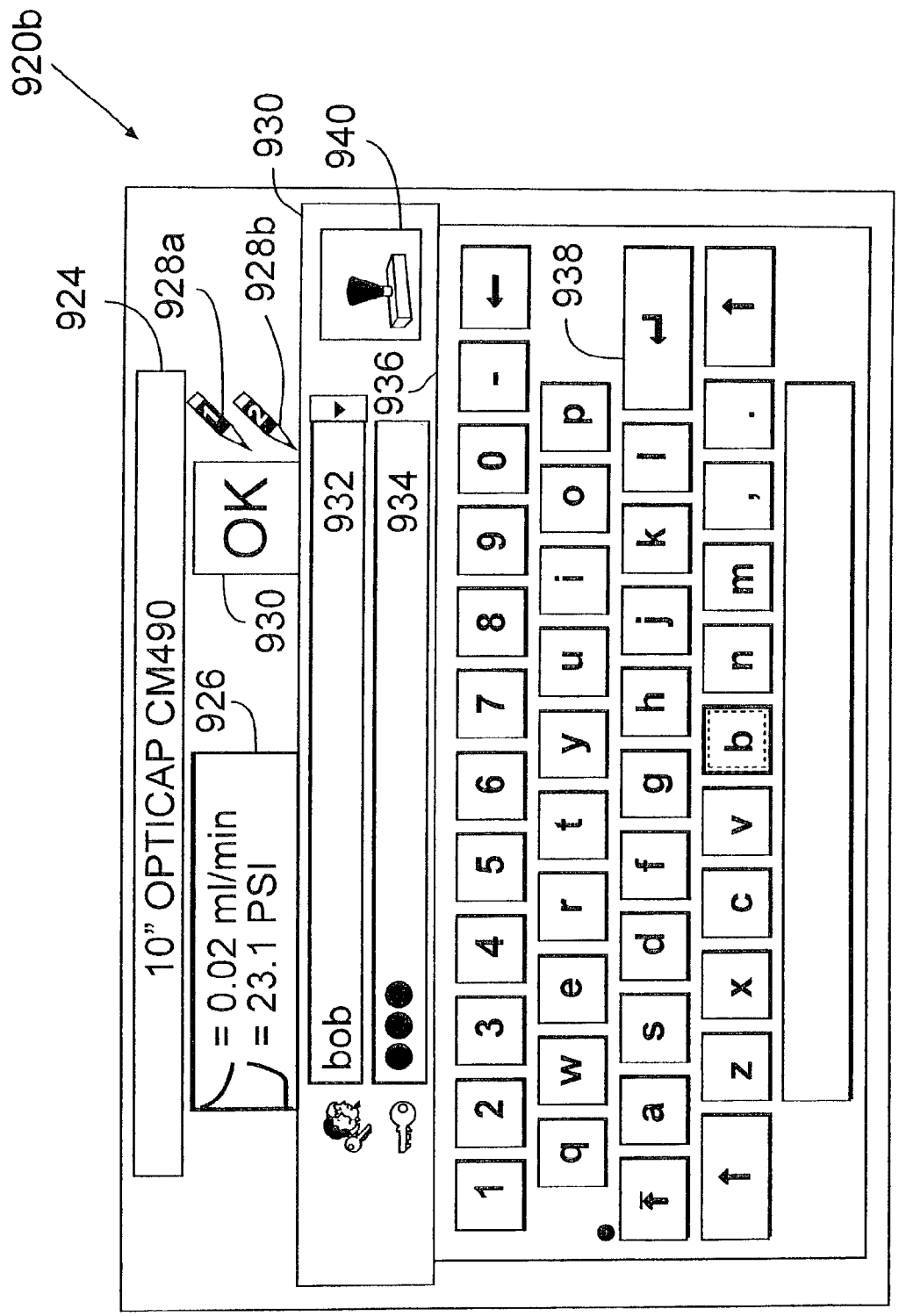

Referring to FIG. 9C, a modified window 920b is shown in which the instrument 112a may display a signature dialog box 930 in response to the user 222 pressing the first signature button 928a. Like the logon screen 400 (FIG. 4A), the signature dialog box 930 includes a first text field 932 into which the user 222 may enter a user name and a second text field 934 into which the user 222 may enter a password. The user 222 may input a username and password into the text fields 932 and 934 using touch screen 206 to enter characters through a soft keyboard 936. The user 222 may submit the username and password to the electronic signature application 728 by pressing an enter key 938 or a signature stamp button 940.

After receiving the electronic signature credentials 722 from the user 222 (step 822), the electronic signature application 728 attempts to authenticate the user 222 using the signature credentials 722 (step 824). The signature credentials 722 may, for example, be the logon credentials 204 that the user 222 used to log on to the instrument 112a (FIG. 2A). More generally, the signature credentials 722 may be a Windows username and password. The electronic signature application 728 may, therefore, attempt to authenticate the user 222 by transmitting an authentication request over the network 160 to the domain controller 180, as described above with respect to FIGS. 2A and 4B.

If the authentication fails (step 826), the electronic signature application 728 prompts the user 222 again for signature credentials 722. More generally, the electronic signature application 728 does not allow the signature process to proceed unless and until the user 222 provides adequate credentials.

If the authentication succeeds (step 826), the electronic signature application 728 determines whether a second signature is required (step 828). The electronic signature application may, for example, determine whether a second signature is required by examining the instrument configuration 220 stored in the local instrument database 224. If a second signature is required, the electronic signature tool 704 obtains signature credentials 726 from a second user 724 (step 830).

Figure 9D:
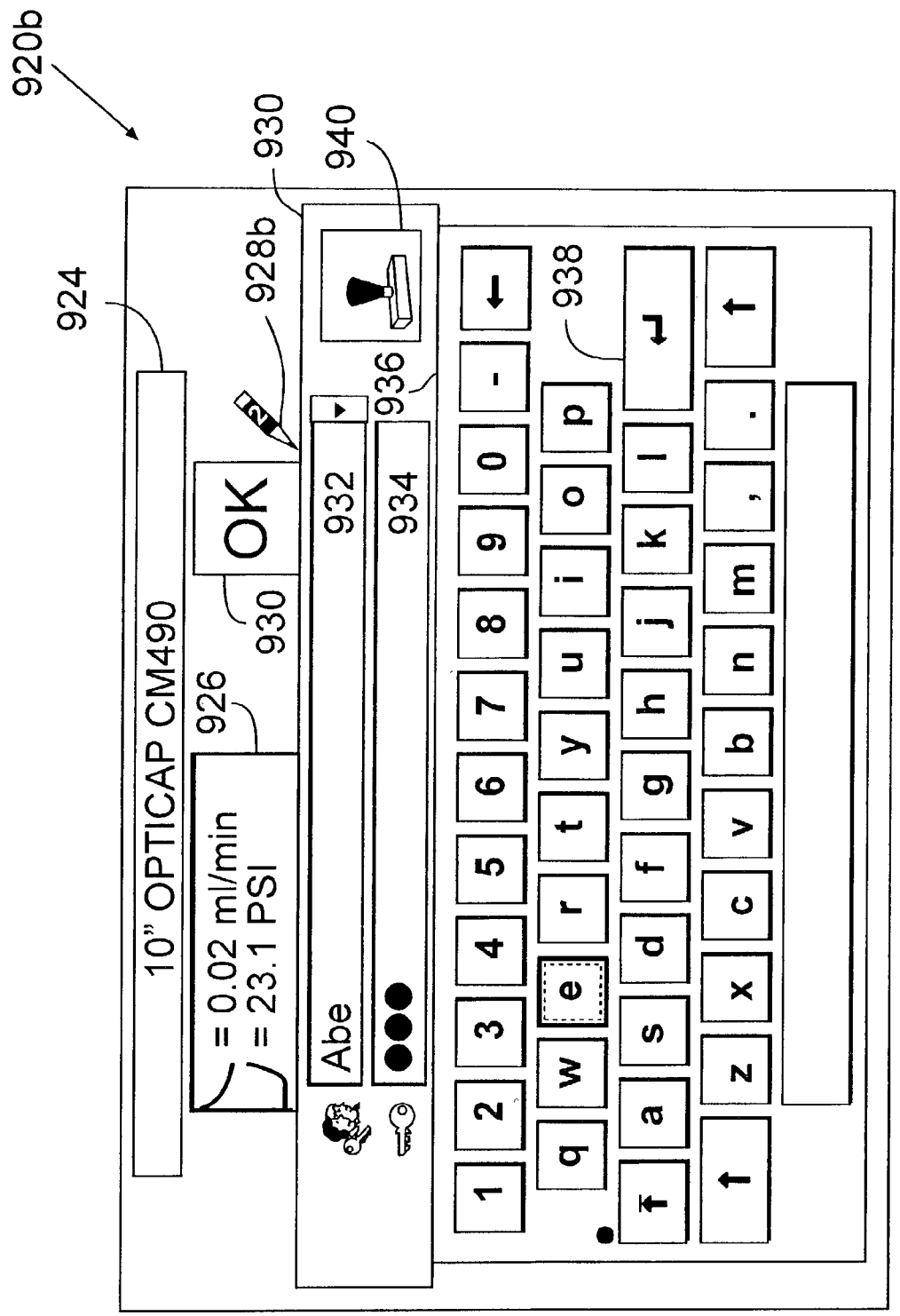

For example, referring again to FIG. 9C, upon entering the first signature credentials 722, the user 222 may press the second signature button 928b, causing the electronic signature application to prompt the second user 724 for a second signature, as illustrated in FIG. 9D. Note that the first signature button 928a is absent from the window 920c in FIG. 9D.

The second user 724 may enter the second signature credentials 726 in the dialog box 930 in the same manner as described above with respect to the first user 222. After the second user 724 enters the second credentials 726, the electronic signature application 728 determines whether the second signature credentials 726 are the same as the first signature credentials 722 (step 832). If both credentials 722 and 726 are the same, the electronic signature application 728 prompts the second user 724 again for credentials 726. In other words, the electronic signature application 728 requires that the signatures 722 and 726 be provided by different users.

If the second credentials 726 are not the same as the first credentials 722, the electronic signature application 728 attempts to authenticate the second user 724 in the same manner as described above with respect to step 824 (step 834). If the authentication does not succeed (step 836), the electronic signature application 728 prompts the second user 724 again for credentials (step 830). In other words, the electronic signature application 728 does not allow the signature process to continue unless the second user 724 provides adequate credentials.

If authentication of the second user 724 succeeds, the electronic signature application 728 determines whether the second signature must be provided by a user having a particular role, such as the role of Supervisor (step 838). The role of Supervisor is used merely as an example herein and does not constitute a limitation of the present invention. Rather, the second signature may be required to be provided by a user having any role or satisfying any specified criteria.

The electronic signature application 728 may make this determination by examining the signatures field of the instrument configuration 220. If the second signature is required to be provided by a Supervisor, the electronic signature application 728 determines whether the second user 724 has the role of Supervisor (step 840). The electronic signature application 728 may, for example, make this determination by examining the user rights 218 stored in the local instrument database 224. If the second user is not a Supervisor, the electronic signature application 728 again requests credentials from the second user 724 (step 830). In other words, the electronic signature application 728 enforces the requirement that the second signature be provided by a Supervisor. The electronic signature application 728 may allow users having a role with greater rights than Supervisor, such as Administrator, to qualify as Supervisors.

When the signature process is complete (either at the completion of step 828, 838, or 840), the electronic signature application 728 appends the signature(s) obtained during the preceding steps to the test results 712 to generate a test report 714. The test report 714 may be transmitted to the central repository 150 and/or the local database 224 for subsequent viewing, printing, or other use.

Figure 9E:
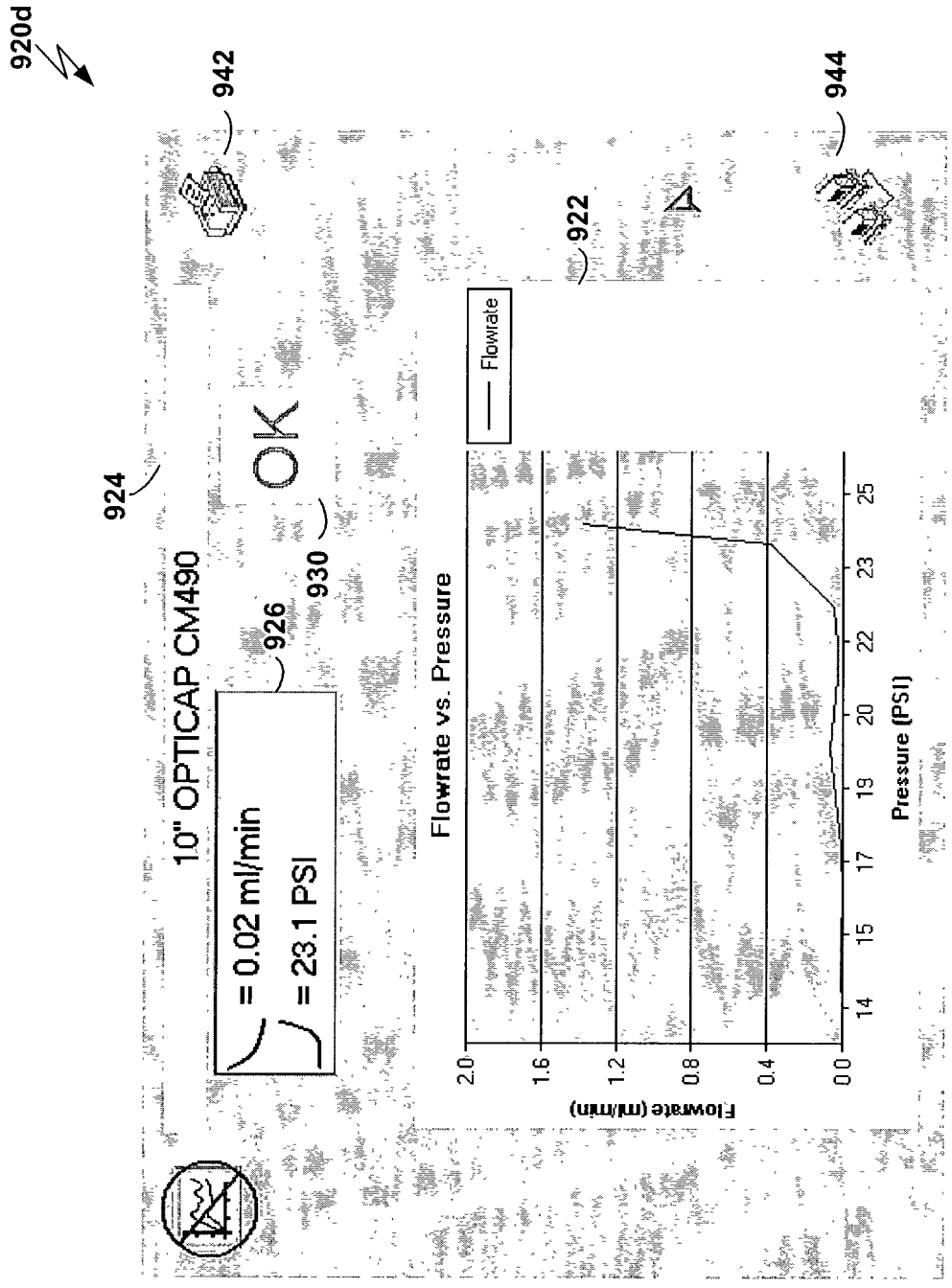

For example, referring to FIG. 9E, upon receiving any required signatures, the user 222 may press a print button 942 in the window 920d to cause the test report 714 to be printed. Alternatively or additionally, the user 222 may press a transmit button 944 to transmit the test report to the central repository 150. The user 222 may press OK button 930 to complete the test process and return to the window 900 illustrated in FIG. 9A.

The instrument management tools 170a-c executing on the instrument 112a, role server 120, and service computer 140 may be used to perform functions such as accessing and modifying information in the role database 130, such as the roles list 122, instruments list 134, instrument groups list 136, and test definitions list 138.

The instances 170a-c may all be the same or may differ to accommodate the particular features of the instruments 112a-f, service computer 140, and role server 120. The instances 170a-c may, for example, be the same but expose different features to the user 222 depending on whether they are executing on one of the instruments 112a-f, on the service computer 140, or on the role server 120. For example, the instrument management tool 170a may only provide access to users having the role of Administrator or Supervisor. Furthermore, if the instrument from which the instrument management tool is launched is operating in isolated or standalone mode, the network-related features of the instrument management tool 170a will be disabled. Although only instrument 112a is illustrated as having an instance of the instrument management tool, instances of the instrument management tool may be provided on all of the instruments 112a-f.

One benefit of the instrument management tool is that it enables information in the role database 130 to be maintained in a central location but accessed and modified from a variety of locations. Central maintenance of the role database 130 is provided by the role server 120, which provides an interface between the role database 130 and components that access it (such as the instruments 112a-f and the service computer 140). Furthermore, although only one service computer 140 is shown in FIG. 1, there may be many service computers (e.g., one in each laboratory cluster) from which the instrument management tool may be executed and the role database 130 accessed.

The instruments 112a-f may download information over the network 160 from the role database 130 and the domain controller 180, such as the users list 132, instruments list 134, instrument groups list 136, and test definitions list 138, at appropriate times, such as upon bootup or after a user logs in to the instrument. The instruments 112a-f may download such information through the role server 120, which provides access to the information in the role database 130. If an instrument is unable to contact the role server 120 for some reason, the instrument may use the values most recently downloaded.

The instrument management tool may also be used to configure the network locations of the elements of the system 100, such as the central repository 150, the instruments 112a-f, the service computer 140, and the role server 120. This information may be stored, for example, by the role server 120. The elements of the system 100 may download this location information from the role server 120 for use to communicate with each other.

The instrument management tools 170a-c may allow, for example, new roles to be added to the roles list 122. The instrument management tools 170a-c may also allow the rights associated with each of the roles in the roles list 122 to be modified.

The instrument management tools 170a-c may also allow, for example, new instruments to be added to the instruments list 134 and existing instruments to be deleted from the instruments list 134. The instrument management tools 170a-c may also allow existing instruments in the instruments list 134 to be configured for use by particular users, to perform particular tests, and to send test reports automatically or manually.

A special instrument ID (such as −1 or 999) may represent an instrument group consisting of all instruments 112a-f in the system 100. Users who are given access rights to this special instrument (e.g., by including their user IDs in the users field 322c of the instruments list element for the special instrument) are given access to all instruments 112a-f in the system 100. This provides a simple means for providing system administrators and other users with access to all instruments 112a-f in the system 100, without needing to manually assign such users to each and every instrument in the system 100.

The instrument management tools 170a-c may also allow, for example, instrument groups to be added to and deleted from the instruments group list 136. The instrument management tools 170a-c may also allow instruments to be added to and deleted from instrument groups and default properties associated with each instrument group to be modified.

As described above, the test definitions 138 define filter integrity tests that may be performed by the instruments 112a-f. The instrument management tools 170a-c may be used to define create, modify, or delete test definitions 138.

When a user modifies information contained in the role database 130 using one of the instrument management tools 170a-c, the changes need to be propagated to the instruments 112a-f in the system 100. If, for example, the user 222 uses the instrument management tool 170a executing on instrument 112a to remove another user's right to access instrument 112f, this change needs to be propagated to instrument 112f.

Such changes in the role database 130 may be propagated to the instruments 112a-f in any of a variety of ways. For example, the role server 120 may propagate any changes in the role database 130 to all of the instruments 112a-f immediately upon any such changes being made. Alternatively, each of the instruments 112a-f may download updates to the role database 130 periodically or upon the occurrence of predetermined events. For example, the instruments 112a-f may each download updates to the role database 130 when they are booted up or each time a user attempts to log in to the instrument. If a particular instrument is not able to connect to the network 160 when attempting to download role database updates, the instrument may use the most recent information stored in its local database (e.g., local database 224 in the case of instrument 112a).

To access the role server 120, each of the instruments 112a-f needs to be configured with the network location of the role server 120. To perform this function, the instrument management tool installed on each of the instruments 112a-f and on each of the service computers may be configured with the network location (e.g., network path or URL) of the role server 120.

Among the advantages of the invention are one or more of the following.

One advantage of various embodiments of the present invention is that administration of instruments and users is centralized. As a result, user rights information and instrument configuration information may be modified in a single data store (e.g., the role database 130). This eliminates the redundant programming of instruments that is common in prior art systems and therefore reduces the amount of time that is needed to maintain the system while eliminating the existence of inconsistent information in different instruments. It may therefore be possible to use the techniques disclosed herein to manage systems including a large number of instruments more easily than prior art systems.

For example, an individual user may be added to the system 100 merely by adding the user to the users list 132 and configuring the user's rights in the role database 130, rather than by separately configuring each of the instruments 112a-f in the system 100 to recognize the new user. Similarly, removing an individual user from the system 100 merely requires modifying the users list 132 and role database 130, rather than separately configuring each of the instruments 112a-f.

Although system information is stored in a centralized location, access to the information is distributed across a network. Users and instruments may therefore access instrument configuration and user rights information from a variety of locations. Centralization of information, therefore, does not come at the expense of instrument distribution. Furthermore, the centralized database may be distributed and/or replicated among multiple data stores using techniques well-known in the art to make access to the database more efficient.

Another advantage of various embodiments of the present invention is that they provide the ability to permit or deny a user access to particular instruments based on predefined user rights that are independent of the rights defined by the underlying operating system. For example, according to the techniques disclosed herein, the system may determine whether a particular user should be granted access to a particular instrument independently of whether the operating system authenticates the user. This allows the system to provide more finely-grained instrument access control than that which is possible in a system in which instrument access is based solely on the authentication mechanism of the underlying operating system.

Yet another advantage of various embodiments of the present invention is that they enable the electronic signature requires of 21 CFR Part 11 to be enforced. In particular, in cases in which a test is required to be signed both by the test operator and by a supervisor, the techniques disclosed herein may be used to ensure that such a signature requirement is met. Automating the enforcement of this requirement reduces the burden that must be placed on organizational policies and procedures for enforcing such a requirement.

It is to be understood that although the invention has been described above in terms of particular embodiments, the foregoing embodiments are provided as illustrative only, and do not limit or define the scope of the invention. Various other embodiments, including but not limited to the following, are also within the scope of the claims.

The instruments 112a-f may be any instruments that may be used in laboratory, pilot, and/or manufacturing areas. Furthermore, there may be any number of instruments of different kinds in any combination. Although in the embodiments disclosed herein the instruments are integrated with means for performing access control and other functions, alternatively the instruments may be connected to external devices for performing such functions.

The particular data structures disclosed herein (such as the data structures illustrated in FIGS. 3A-3E) are provided merely for purposes of example and do not constitute limitations of the present invention. Rather, any data structures may be employed for performing the same functions. Furthermore, the various lists in the role database 130 may contain a greater or lesser number of fields and may be combined into a lesser number of lists or separated into a greater number of lists for storing the same information. More generally, any combination of the various elements and components described herein may be further divided into additional components or joined together to form fewer components for performing the same functions.

Although the Windows XP operating system is described herein as an operating system on which various software programs may execute, this is merely an example. Any operating system or combination of operating systems may be employed to execute software that performs the functions described herein. Furthermore, the underlying operating system need not be used to perform user authentication. Rather, the system 100 may provide its own user authentication system that is entirely independent of the underlying operating system.

The techniques described above may be implemented, for example, in hardware, software, firmware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by a computer processor executing a program tangibly embodied on a computer-readable medium to perform functions of the invention by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

The invention claimed is:

1. A method of authenticating a shared laboratory test instrument user prior to accessing the shared laboratory test instrument in order to perform one or more lab tests using the shared laboratory test instrument comprising the steps of:
  (A) providing a user authenticating lab instrument access control and management system comprising a plurality of network connected shared laboratory test instruments;
  (B) receiving logon credentials from a user in an attempt to access a select one of the plurality of shared laboratory test instruments;
  (C) authenticating the user as an authorized user of the system based on the logon credentials associated with the user prior to accessing the shared laboratory test instrument;
  (D) determining whether the logon credentials authorize the user to access the select one of the plurality of shared laboratory test instruments by comparing the credentials to credential information stored in a data store accessible over a network to the plurality of shared laboratory test instruments by the following steps,
    (D)(1) identifying a role of the user;
    (D)(2) identifying a set of default laboratory test instrument access rights associated with the role;
    (D)(3) identifying a set of user-specific laboratory test instrument access rights associated with the user;
    (D)(4) applying the user-specific laboratory test instrument access rights to the default laboratory test instrument access rights to obtain a set of final laboratory test instrument access rights associated with the user;
    (D)(5) determining whether the set of final laboratory test instrument access rights associated with the user includes the right to access the select one of the plurality of shared laboratory test instruments; and
    (D)(6) determining that the logon credentials authorize the user to access the select one of the plurality of shared laboratory test instruments if it is determined that the set of final laboratory test instrument access rights associated with the user includes the right to access the select one of the plurality of shared laboratory test instruments;
  (E) granting the user access to the select one of the plurality of shared laboratory test instruments only if it is determined that the user is an authorized user of the system and the logon credentials authorize the user to access the select one of the plurality of shared laboratory test instruments;
  (F) identifying a set of operations that the user has the right to perform using the select one of the plurality of shared laboratory test instruments for performing one or more laboratory tests on the integrity of a membrane-based separation device;
  (G) allowing the user to perform on the select one of the plurality of shared laboratory test instruments only those operations in the identified set of operations for performing one or more laboratory tests on the integrity of a membrane-based separation device; and
  (H) performing one or more tests using the select one of the plurality of the shared laboratory test instruments.

2. The method of claim 1, wherein step (C) is performed by an operating system authentication mechanism.

3. The method of claim 2, wherein step (E) is performed by means distinct from the operating system authentication mechanism.

4. The method of claim 3, wherein the means distinct from the operating system authentication mechanism comprises a server serving the data store.

5. The method of claim 1, wherein step (D) is performed by a computer on which an operating system executes, wherein the operating system recognizes a first set of user roles, and wherein step (D)(1) comprises a step of selecting the role from among a second set of roles that is independent of the first set of roles.

6. The method of claim 1, wherein step (D) is performed by a software program executed by a computer executing an operating system, wherein the operating system recognizes a first set of user roles, and wherein the first determining means comprises means for identifying the role from among a second set of roles that is independent of the first set of roles.

7. The method of claim 1, wherein step (B) comprises a step of receiving the logon credentials from the user through an input device coupled locally to the select one of the plurality of shared laboratory test instruments.

8. The method of claim 1, wherein the logon credentials comprise a username and a password.

9. The method of claim 1, wherein step (D) comprises a step of determining whether the logon credentials authorize the user to access the select one of the plurality of shared laboratory test instruments by comparing the credentials to credential information stored in a local copy of the data store.

10. A method of authenticating a shared laboratory test instrument user prior to accessing the shared laboratory test instrument in order to perform one or more lab tests using the shared laboratory test instrument comprising the steps of:
(A) providing a user authenticating lab instrument access control and management system comprising a plurality of network connected shared laboratory test instruments,
(B) receiving logon credentials from a user in an attempt to access a select one of the plurality of shared laboratory test instruments;
(C) authenticating the user as an authorized user of the system based on the logon credentials associated with the user prior to accessing a shared laboratory test instrument;
(D) determining whether the logon credentials authorize the user to access the select one of the plurality of shared laboratory test instruments by comparing the credentials to credential information stored in a data store accessible over a network to the plurality of shared laboratory test instruments comprising the steps of comprises steps of:
(D)(1) identifying a role of the user;
(D)(2) identifying a set of default laboratory test instrument access rights associated with the role;
(D)(3) identifying a set of user-specific laboratory test instrument access rights associated with the user;
(D)(4) applying the user-specific laboratory test instrument access rights to the default laboratory test instrument access rights to obtain a set of final laboratory test instrument access rights associated with the user;
(D)(5) determining whether the set of final laboratory test instrument access rights associated with the user includes the right to access the select one of the plurality of shared laboratory test instruments; and
(D)(6) determining that the logon credentials authorize the user to access the select one of the plurality of shared laboratory test instruments if it is determined that the set of final laboratory test instrument access rights associated with the user includes the right to access the select one of the plurality of shared laboratory test instruments;
(E) granting the user access to the select one of the plurality of shared laboratory test instruments only if it is determined that the user is an authenticated and authorized user of the system and the logon credentials authorize the user to access the select one of the plurality of shared laboratory test instruments; and
(F) performing one or more tests using the shared laboratory test instrument.

11. The method of claim 10, wherein the step (C) is performed by an operating system authentication mechanism.

12. The method of claim 11, wherein the step (E) is performed by means distinct from the operating system authentication mechanism.

13. The method of claim 12, wherein the means distinct from the operating system authentication mechanism comprises a server serving the data store.

14. The method of claim 10, wherein the step (D) is performed by a computer on which an operating system executes, wherein the operating system recognizes a first set of user roles.

15. The method of claim 10, wherein the logon credentials comprise a username and a password.

16. The method of claim 10, further comprising a step of:
(G) identifying a set of operations that the user has the right to perform using the select one of the plurality of shared laboratory test instruments for performing one or more laboratory tests on the integrity of a membrane-based separation device; and
(H) allowing the user to perform on the select one of the plurality of shared laboratory test instruments only those operations in the identified set of operations for performing one or more laboratory tests on the integrity of a membrane-based separation device.

17. The method of claim 10, wherein the step (B) comprises a step of receiving the logon credentials from the user through an input device coupled locally to the select one of the plurality of shared laboratory test instruments.

18. The method of claim 10, wherein the step (D) further comprises steps of:
(D)(7) transmitting an authorization request over the network to a server;
(D)(8) receiving an authorization response over the network from the server; and
(D)(9) determining whether the authorization response indicates that the logon credentials authorize the user to access the select one of the plurality of shared test laboratory instruments.

19. A user authentication system for authenticating a user prior to accessing a plurality of network connected shared laboratory test instrument comprising:
(a) a user authenticating lab instrument access control and management system comprising a plurality of network connected shared laboratory test instruments;
(b) receiving means for receiving logon credentials from a user in an attempt to access a select one of the plurality of shared laboratory test instruments;
(c) first determining means for determining whether the logon credentials authorize the user to access the select one of the plurality of shared laboratory test instruments by comparing the credentials to credential information stored in a data store accessible over a network to the plurality of shared laboratory test instruments, wherein the first determining means comprises,
(i) first identifying means for identifying a role of the user;
(ii) second identifying means for identifying a set of default laboratory test instrument access rights associated with the role;
(iii) third identifying means for identifying a set of user-specific laboratory test instrument access rights associated with the user;
(iv) application means for applying the user-specific laboratory test instrument access rights to the default laboratory test instrument access rights to obtain a set of final laboratory test instrument access rights associated with the user;
(v) second determining means for determining whether the set of final laboratory test instrument access rights associated with the user includes the right to access the select one of the plurality of shared laboratory test instruments; and (vi) third determining means for determining that the logon credentials authorize the user to access the select one of the plurality of shared laboratory test instruments if it is determined that the set of final laboratory test instrument access rights associated with the user includes the right to access the select one of the plurality of shared laboratory test instruments;

(d) authenticating means for determining whether the user is an authorized user of the system based on the logon credentials prior to accessing a network connected shared laboratory test instrument;

(e) rights granting means for granting the user access to the select one of the plurality of shared laboratory test instruments only if it is determined that the user is an authorized user of the system and it is determined that the logon credentials authorize the user to access the select one of the plurality of shared laboratory test instruments, and (f) a shared laboratory test instrument management tool for instructing the plurality of shared laboratory instruments to perform one or more tests.

20. The system of claim 19, wherein the authenticating means comprises a component of an operating system authentication mechanism.

21. The system of claim 20, wherein the rights granting means comprises a component distinct from the operating system authentication mechanism.

22. The system of claim 21, wherein the component distinct from the operating system authentication mechanism comprises a server serving the data store.

23. The system of claim 19, wherein the first determining means comprises a software program executing on a computer on which an operating system executes, wherein the operating system recognizes a first set of user roles, and wherein the first identifying means comprises means for selecting the role from among a second set of roles that is independent of the first set of roles.

24. The system of claim 19, wherein the receiving means comprises means for receiving the logon credentials from the user through an input device coupled locally to the select one of the plurality of laboratory test instruments.

25. The system of claim 19, wherein the logon credentials comprise a username and a password.

26. The system of claim 19, further comprising:
means for identifying a set of operations that the user has the right to perform using the select one of the plurality of shared laboratory test instruments; and
means for allowing the user to perform on the select one of the plurality of shared laboratory test instruments only those operations in the identified set of operations.

27. The system of claim 19, wherein the first determining means comprises means for determining whether the logon credentials authorize the user to access the select one of the plurality of shared laboratory test instruments by comparing the credentials to credential information stored in a local copy of the data store.

28. The system of claim 19, wherein the first determining means comprises:
means for transmitting an authorization request over the network to a server;
means for receiving an authorization response over the network from the server; and
means for determining whether the authorization response indicates that the logon credentials authorize the user to access the select one of the plurality of shared laboratory test instruments.

* * * * *

UNITED STATES PATENT AND TRADEMARK OFFICE
CERTIFICATE OF CORRECTION

PATENT NO.      : 7,661,127 B2
APPLICATION NO. : 10/292666
DATED           : February 9, 2010
INVENTOR(S)     : Thomas Steven Hirsch It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 878 days.

Signed and Sealed this

Thirtieth Day of November, 2010

David J. Kappos
*Director of the United States Patent and Trademark Office*